United States Patent
Yoshioka et al.

(10) Patent No.: US 10,525,394 B2
(45) Date of Patent: Jan. 7, 2020

(54) HONEYCOMB FILTER

(71) Applicant: NGK INSULATORS, LTD., Nagoya (JP)

(72) Inventors: Fumihiko Yoshioka, Nagoya (JP); Kazuto Miura, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 157 days.

(21) Appl. No.: 15/455,428

(22) Filed: Mar. 10, 2017

(65) Prior Publication Data

US 2017/0274312 A1    Sep. 28, 2017

(30) Foreign Application Priority Data

Mar. 23, 2016 (JP) .................... 2016-058270

(51) Int. Cl.
    *B01D 46/24*    (2006.01)
    *B01D 46/00*    (2006.01)

(52) U.S. Cl.
    CPC ..... *B01D 46/2459* (2013.01); *B01D 46/0061* (2013.01); *B01D 46/247* (2013.01);
    (Continued)

(58) Field of Classification Search
    None
    See application file for complete search history.

(56) References Cited

U.S. PATENT DOCUMENTS

| | | | |
|---|---|---|---|
| 4,519,820 A * | 5/1985 | Oyobe | B01D 46/2407 159/DIG. 10 |
| 5,720,787 A * | 2/1998 | Kasai | B01D 46/2455 55/282 |

(Continued)

FOREIGN PATENT DOCUMENTS

| | | |
|---|---|---|
| DE | 10 2014 004 712 A1 | 10/2014 |
| EP | 2 108 434 A1 | 10/2009 |

(Continued)

OTHER PUBLICATIONS

U.S. Appl. No. 15/455,330, filed Mar. 10, 2017, Fumihiko Yoshioka et al.

(Continued)

*Primary Examiner* — Amber R Orlando
(74) *Attorney, Agent, or Firm* — Burr & Brown, PLLC

(57) ABSTRACT

A honeycomb filter includes a pillar-shaped honeycomb substrate including a porous partition wall that defines a plurality of cells extending from an inflow end face to an outflow end face, an inflow side plugging portion disposed at the inflow end face of the honeycomb substrate to plug open ends of outflow cells and an outflow side plugging portion disposed at the outflow end face of the honeycomb substrate to plug open ends of inflow cells other than the outflow cells. The honeycomb substrate includes the partition wall that defines two of the inflow cells by division. An average of the plugging length $L_{IN}$ of the inflow side plugging portions disposed in the outflow cells of the honeycomb substrate is larger than an average of the plugging length $L_{OUT}$ of the outflow side plugging portions disposed in the inflow cells of the honeycomb substrate.

10 Claims, 11 Drawing Sheets

(52) U.S. Cl.
CPC .. *B01D 46/2466* (2013.01); *B01D 2046/2481* (2013.01); *B01D 2046/2492* (2013.01)

(56) References Cited

U.S. PATENT DOCUMENTS

| | | | |
|---|---|---|---|
| 7,159,390 B2 * | 1/2007 | Saito | B01D 46/2429 |
| | | | 60/297 |
| 7,244,284 B2 | 7/2007 | Miwa et al. | |
| 7,547,342 B2 | 6/2009 | Mizutani | |
| 7,695,540 B2 | 4/2010 | Mizutani | |
| 7,967,887 B1 * | 6/2011 | Yonushonis | B01D 46/527 |
| | | | 422/169 |
| 9,566,544 B2 * | 2/2017 | Iwasaki | B01D 46/2459 |
| 2004/0258582 A1 | 12/2004 | Miwa et al. | |
| 2007/0180804 A1 | 8/2007 | Mizutani | |
| 2007/0240396 A1 * | 10/2007 | Mizutani | B01D 46/2459 |
| | | | 55/523 |
| 2010/0300291 A1 | 12/2010 | Vincent et al. | |
| 2014/0298779 A1 * | 10/2014 | Miyairi | F01N 3/035 |
| | | | 60/298 |
| 2015/0037532 A1 | 2/2015 | Shibata et al. | |

FOREIGN PATENT DOCUMENTS

| | | |
|---|---|---|
| JP | 2007-092627 A | 4/2007 |
| JP | 2007-209842 A1 | 8/2007 |
| JP | 4279497 B2 | 6/2009 |
| JP | 2009-240867 A | 10/2009 |
| JP | 4567674 B2 | 10/2010 |
| JP | 2011-506093 A | 3/2011 |
| JP | 2012-081415 A1 | 4/2012 |
| JP | 2012-254441 A | 12/2012 |
| JP | 2014-200741 A | 10/2014 |
| JP | 2015-029939 A | 2/2015 |
| WO | 2005/089902 A1 | 9/2005 |

OTHER PUBLICATIONS

German Office Action, German Application No. 10 2017 002 529.0, dated Apr. 12, 2019 (6 pages).
Japanese Office Action (with English translation), Japanese Application No. 2016-058270, dated Aug. 6, 2019 (6 pages).

* cited by examiner

HONEYCOMB FILTER

The present application is an application based on JP 2016-058270 filed on Mar. 23, 2016 with Japan Patent Office, the entire contents of which are incorporated herein by reference.

BACKGROUND OF THE INVENTION

Field of the Invention

The present invention relates to honeycomb filters. Specifically the present invention relates to a honeycomb filter having excellent temperature-rising property of inflow cells having open ends at the inflow end face, and having excellent heat-retaining property of the inflow cells when exhaust gas passes through the honeycomb filter.

Description of the Related Art

Internal combustion engines are used as a power source in various industries. Exhaust gas emitted from an internal combustion engine during fuel burning, however, contain particulate matters, such as soot and ash, together with toxic gas, such as nitrogen oxides. Hereinafter the particulate matters may be called "PM". "PM" stands for "Particulate Matter". Regulations on the removal of PM emitted from a diesel engine are becoming stricter worldwide. A honeycomb-structured wall flow type filter, for example, has been used for a filter to remove such PM.

Various types of honeycomb filters have been proposed as the wall-flow type filter, and such a filter includes a honeycomb substrate having a porous partition wall that defines a plurality of cells serving as a through channel of fluid, and a plugging portion disposed at the open ends of the plurality of cells on any one side (see Patent Documents 1 to 4). Such a honeycomb filter has inflow cells having a plugging portion at their outflow end faces and outflow cells having a plugging portion at their inflow end faces, the inflow cells and the outflow cells being disposed alternately via the partition wall. The porous partition wall serves as a filter to remove PM.

For a long term use of a honeycomb filter, the honeycomb filter has to be regenerated regularly. This is because PM, such as soot, is deposited inside of the honeycomb filter over time, so that the pressure loss of the filter increases gradually. In order to bring back the filtering performance of the honeycomb filter closer to its initial state, PM, such as soot, deposited inside of the honeycomb filter has to be burned with a high-temperature gas for removal. For a smooth regeneration treatment, a honeycomb filter may be loaded with catalyst to burn the soot for removal. For such catalyst, noble metals, such as platinum and palladium, are used. In the following, the operation to burn the soot deposited inside of a honeycomb filter may be called simply "regeneration" of the honeycomb filter.

[Patent Document 1] JP-A-2007-209842
[Patent Document 2] JP-A-2012-081415
[Patent Document 3] JP-B-4279497
[Patent Document 4] JP-B-4567674

SUMMARY OF THE INVENTION

When a honeycomb filter as described in Patent Documents 1 to 4 is regenerated, the temperature in the cells has to be increased to a predetermined temperature or more. A honeycomb filter having catalyst loaded therein to burn soot for removal also is required to increase the temperature in the cells to the temperature activating the catalyst quickly so as to burn the soot for removal effectively through a reaction of the catalyst. To this end, various studies have been conducted for conventional honeycomb filters to improve the temperature-rising property of inflow cells having open ends at the inflow end face.

The temperature of exhaust gas emitted from an internal combustion engine, such as an automobile, typically is not constant, and the temperature varies from moment to moment in accordance with its operating state. For instance, during travelling in the city area, the automobile repeats stopping, accelerating, constant-speed running, decelerating, and stopping. As a result, the temperature of exhaust gas emitted from the engine may vary depending on the travelling state.

A honeycomb filter having improved temperature-rising property of the inflow cells is likely affected by a temperature variation of the exhaust gas. Therefore when the temperature of the exhaust gas falls temporarily, the temperature in the cells also drops quickly. Especially a technique for "continuous regeneration" has been recently proposed, and this technique is to regenerate a honeycomb filter continuously by converting NO in the exhaust gas to $NO_2$ with oxidation catalyst, and burning PM trapped in the honeycomb filter with this $NO_2$ as an oxidant. In this "continuous regeneration", if the temperature in cells fluctuates with a change in temperature of the exhaust gas, the catalyst action by the oxidation catalyst becomes intermittent. This leads to a problem of failing to regenerate a honeycomb filter favorably.

Therefore the development of a honeycomb filter has been requested, which has excellent temperature-rising property of the inflow cells and hardly decreases in temperature of the inflow cells even when the temperature of exhaust gas falls temporarily.

In view of such problems of the conventional techniques, the present invention aims to provide a honeycomb filter having excellent temperature-rising property of the inflow cells having open ends at the inflow end face and having excellent heat-retaining property of the inflow cells when exhaust gas passes through the honeycomb filter.

The present invention provides the following honeycomb filter.

According to a first aspect of the present invention, a honeycomb filter is provided including: a pillar-shaped honeycomb substrate including a porous partition wall that defines a plurality of cells extending from an inflow end face to an outflow end face; an inflow side plugging portion disposed at the inflow end face of the honeycomb substrate to plug open ends of outflow cells that are a part of the plurality of cells; and an outflow side plugging portion disposed at the outflow end face of the honeycomb substrate to plug open ends of inflow cells other than the outflow cells of the plurality of cells, wherein the honeycomb substrate includes the partition wall that defines two of the inflow cells by division, and an average of plugging length $L_{in}$ of the inflow side plugging portions disposed in the outflow cells of the honeycomb substrate is larger than an average of plugging length $L_{out}$ of the outflow side plugging portions disposed in the inflow cells of the honeycomb substrate.

According to a second aspect of the present invention, the honeycomb filter according to the first aspect is provided, wherein the average of the plugging length $L_{IN}$ is larger than the average of the plugging length $L_{OUT}$ by at least 1.0 mm.

According to a third aspect of the present invention, the honeycomb filter according to the second aspect is provided, wherein the average of the plugging length LM is larger than the average of the plugging length $L_{OUT}$ by 1.0 to 4.0 mm.

According to a fourth aspect of the present invention, the honeycomb filter according to any one of the first to third aspects is provided, wherein plugging length $L_{IN}$ in the cell extending direction of the inflow side plugging portion disposed in one outflow cell of the outflow cells is larger than a plugging length $L_{OUT}$ in the cell extending direction of the outflow side plugging portion disposed in the inflow cell adjacent to the one outflow cell via the partition wall.

According to a fifth aspect of the present invention, the honeycomb filter according to the fourth aspect is provided, wherein the plugging length $L_{IN}$ of the inflow side plugging portion disposed in the one outflow cell is larger than the plugging length $L_{OUT}$ of the outflow side plugging portion disposed in the inflow cell adjacent to the one outflow cell via the partition wall by at least 1.0 mm.

According to a sixth aspect of the present invention, the honeycomb filter according to the fifth aspect is provided, wherein the plugging length Lm of the inflow side plugging portion disposed in the one outflow cell is larger than the plugging length $L_{OUT}$ of the outflow side plugging portion disposed in the inflow cell adjacent to the one outflow cell via the partition wall by 1.0 to 4.0 mm.

According to a seventh aspect of the present invention, the honeycomb filter according to any one of the first to sixth aspects is provided wherein the outflow cells and the inflow cells have different shapes at open ends.

According to an eighth aspect of the present invention, the honeycomb filter according to any one of the first to seventh aspects is provided, wherein an area $S_{OUT}$ of the outflow cells at the open ends and an area $S_{IN}$ of the inflow cells at the open ends are different.

According to a ninth aspect of the present invention, the honeycomb filter according to the eighth aspect is provided, wherein the area $S_{OUT}$ of the outflow cells at the open ends is larger than the area $S_{IN}$ of the inflow cells at the open ends.

According to a tenth aspect of the present invention, the honeycomb filter according to any one of the first to ninth aspects is provided, wherein the honeycomb substrate has a cell configuration, in which a plurality of the inflow cells surround one of the outflow cells.

According to an eleventh aspect of the present invention, the honeycomb filter according to any one of the first to tenth aspects is provided, wherein the outflow cells has a quadrangular cell shape and the inflow cells have a pentagonal or hexagonal cell shape.

According to a twelfth aspect of the present invention, the honeycomb filter according to any one of the first to eleventh aspects is provided, including: a plurality of the honeycomb substrates; and a bonding layer disposed between lateral faces of the plurality of honeycomb substrates.

The honeycomb filter of the present invention has the effect of having excellent temperature-rising property of inflow cells having open ends at the inflow end face, and having excellent heat-retaining property of the inflow cells when exhaust gas passes through the honeycomb filter.

That is, since the inflow cells of the honeycomb filter of the present invention is made up of a space into which exhaust gas is directly introduced, when the temperature of exhaust gas introduced rises, the temperature of the inflow cells rises quickly. The honeycomb substrate of the honeycomb filter of the present invention has a partition wall to define two inflow cells by division. Hereinafter the partition wall to define two inflow cells by division may be called a "partition wall to divide the inflow cells". The partition wall dividing the inflow cells is not in contact with the inflow side plugging portion. Therefore the partition wall dividing the inflow cells has a heat capacity that is locally smaller than those of the partition wall at the other part in contact with the inflow side plugging portion and of the inflow side plugging portion. With this configuration, when the temperature of exhaust gas introduced rises, the temperature of the partition wall dividing the inflow cells rises quickly, and subsequently, the temperature at the inflow end face of the honeycomb substrate rises uniformly. The honeycomb filter of the present invention is configured so that the inflow side plugging portion disposed in the outflow cells has the average of the plugging length $L_{IN}$ that is larger than the average of the plugging length $L_{OUT}$ of the outflow side plugging portion disposed in the inflow cells. With this configuration, when exhaust gas at a relatively low temperature flows in because of a change in the operating state, for example, the temperature firstly drops at the partition wall dividing the inflow cells having a locally small heat capacity. Note here that since the partition wall at a part in contact with the inflow side plugging portion and the inflow side plugging portion have a large heat capacity, the temperature hardly drops at the inflow end face of the honeycomb filter. Therefore the honeycomb filter has excellent heat-retaining property at the inflow end face. Especially the honeycomb filter of the present invention is configured so that the average of the plugging length $L_{IN}$ of the inflow side plugging portion is large, whereby the honeycomb filter has excellent heat-retaining property.

The honeycomb filter of the present invention is configured so that the average of the plugging length $L_{OUT}$ at the outflow side plugging portion is relatively small. With this configuration, effective filtering area of the honeycomb substrate can be obtained favorably, and an increase in pressure loss of the honeycomb substrate can be effectively suppressed.

DESCRIPTION OF THE PREFERRED EMBODIMENTS

Figure 1:
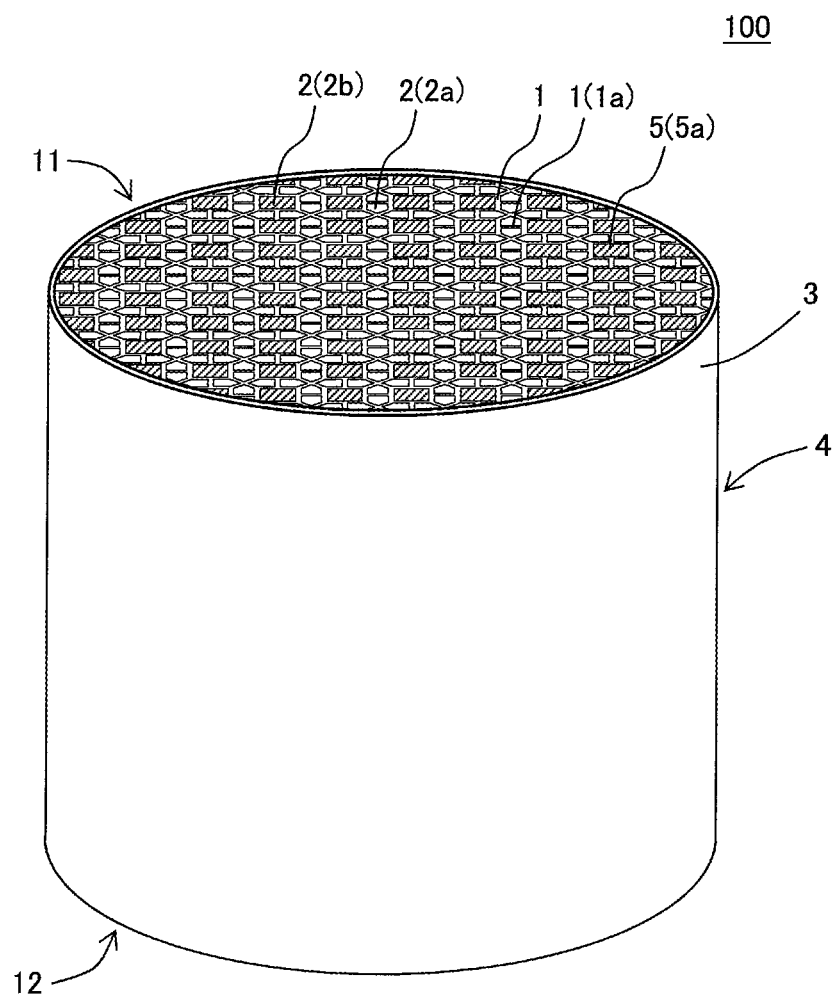
FIG. 1 is a perspective view schematically showing one embodiment of the honeycomb filter of the present invention.

The following describes embodiments of the present invention. The present invention is not limited to the following embodiments, and is to be understood to include the following embodiments, to which modifications and improvements are added as needed based on the ordinary knowledge of a person skilled in the art without departing from the scope of the present invention.

(1) Honeycomb Filter:

One embodiment of the honeycomb filter of the present invention is a honeycomb filter 100 as shown in FIGS. 1 to 5. The honeycomb filter 100 includes a honeycomb substrate 4, a plurality of inflow side plugging portions 5a and a plurality of outflow side plugging portions 5b. The honeycomb substrate 4 includes a porous partition wall 1. In the honeycomb substrate 4, a plurality of cells 2 are defined by the porous partition wall 1, and the plurality of cells extend from the inflow end face 11 to the outflow end face 12 and serve as a through channel of fluid. The inflow side plugging portion 5a is disposed at the inflow end face 11 of the honeycomb substrate 4 to plug the open ends of outflow cells 2b that are a part of the plurality of cells 2. The outflow side plugging portion 5b is disposed at the outflow end face 12 of the honeycomb substrate 4 to plug the open ends of inflow cells 2a other than the outflow cells 2b of the plurality of cells 2. In the honeycomb filter 100 of the present embodiment, the honeycomb substrate 4 has a partition wall 1a to define two inflow cells 2a by division. Hereinafter the partition wall 1a to define two inflow cells 2a by division may be called a "partition wall 1a to divide the inflow cells 2a". The partition wall 1a to define two inflow cells 2a by division refers to a partition wall having a certain width or more in the dividing direction in the state of dividing the two inflow cells 2a.

The honeycomb filter 100 is configured so that the inflow side plugging portion 5a disposed in the outflow cells 2b of the honeycomb substrate 4 has the average of the plugging length $L_{IN}$ that is larger than the average of the plugging length $L_{OUT}$ of the outflow side plugging portion 5b disposed in the inflow cells 2a of the honeycomb substrate 4.

The thus configured honeycomb filter 100 has excellent temperature-rising property of the inflow cells 2a and excellent heat-retaining property of the inflow cells 2a when exhaust gas passes through the honeycomb filter. That is, the honeycomb substrate 4 of the honeycomb filter 100 has the partition wall 1a to divide the inflow cells 2a. The partition wall 1a dividing the inflow cells 2a is not in contact with the inflow side plugging portion 5a. Therefore the partition wall at this part has a heat capacity that is locally smaller than those of the partition wall 1 at the other part in contact with the inflow side plugging portion 5a and of the inflow side plugging portion 5a. With this configuration, when the temperature of exhaust gas introduced rises, the temperature of the partition wall 1a dividing the inflow cells 2a rises quickly, and subsequently, the temperature at the inflow end face 11 of the honeycomb substrate 4 rises uniformly. The honeycomb filter 100 of the present embodiment is configured so that the inflow side plugging portion 5a disposed in the outflow cells 2b has the average of the plugging length $L_{IN}$ that is larger than the average of the plugging length $L_{OUT}$ of the outflow side plugging portion 5b disposed in the inflow cells 2a. With this configuration, when exhaust gas at a relatively low temperature flows in because of a change in the operating state, the temperature firstly drops at the partition wall 1a dividing the inflow cells 2a having a locally small heat capacity. Note here that since the partition wall 1 at a part in contact with the inflow side plugging portion 5a and the inflow side plugging portion 5a have a large heat capacity, the temperature hardly drops at the inflow end face 11 of the honeycomb filter 100. Therefore the honeycomb filter has excellent heat-retaining property at the inflow end face. Especially the honeycomb filter 100 of the present embodiment is configured so that the average of the plugging length $L_{IN}$ of the inflow side plugging portion 5a is large, whereby the honeycomb filter has excellent heat-retaining property.

The honeycomb filter 100 is configured so that the average of the plugging length $L_{OUT}$ of the outflow side plugging portion 5b is relatively small, and therefore the effective filtering area of the honeycomb substrate 4 can be kept favorably and a rise in pressure loss of the honeycomb substrate 4 can be suppressed effectively.

Figure 2:
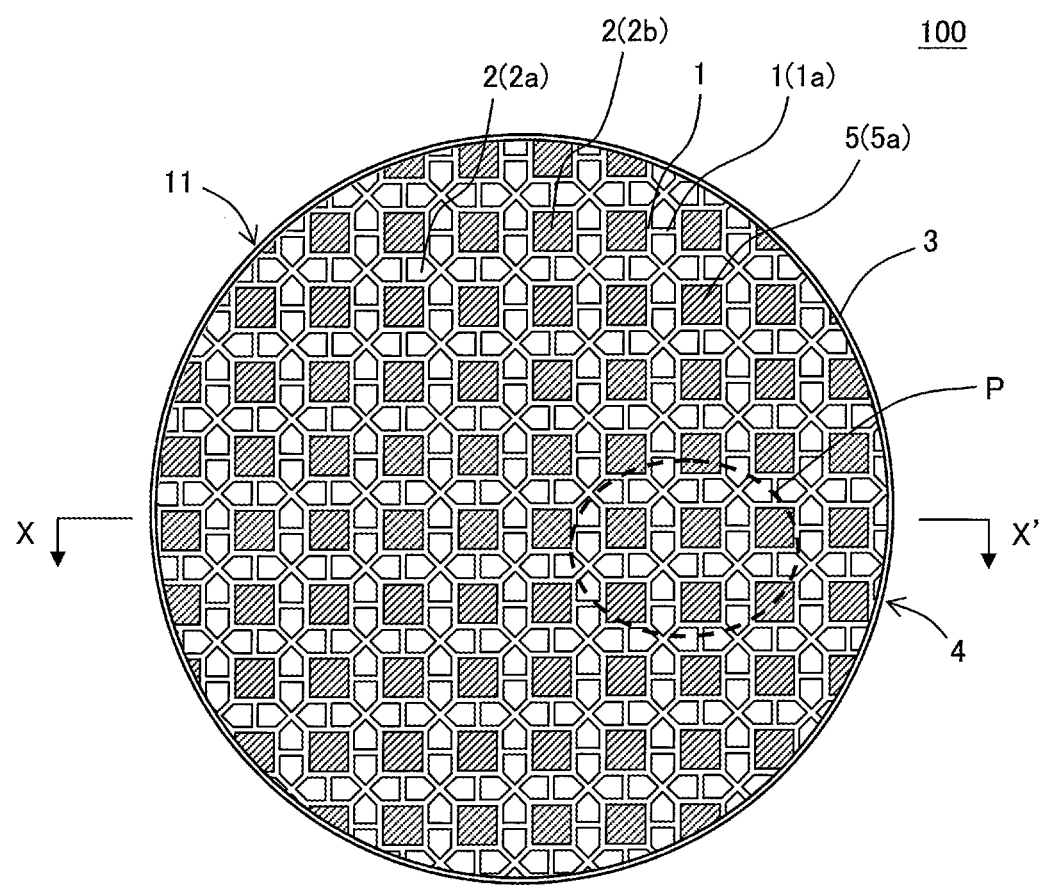
FIG. 2 is a plan view schematically showing the inflow end face of the honeycomb filter of FIG. 1.
Figure 3:
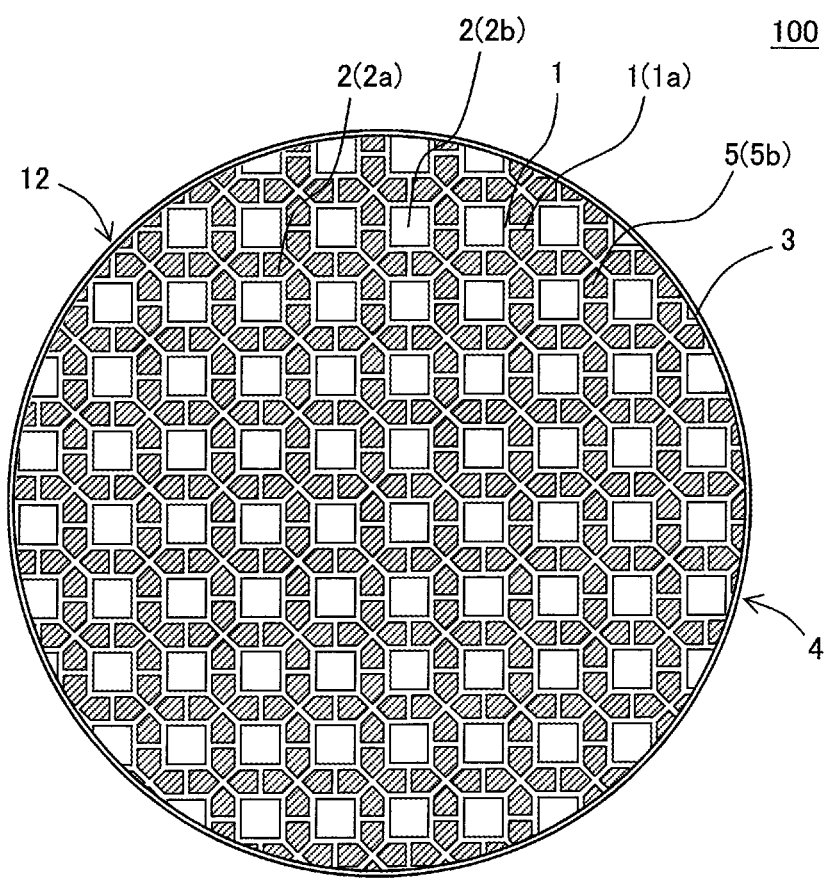
FIG. 3 is a plan view schematically showing the outflow end face of the honeycomb filter of FIG. 1.
Figure 4:
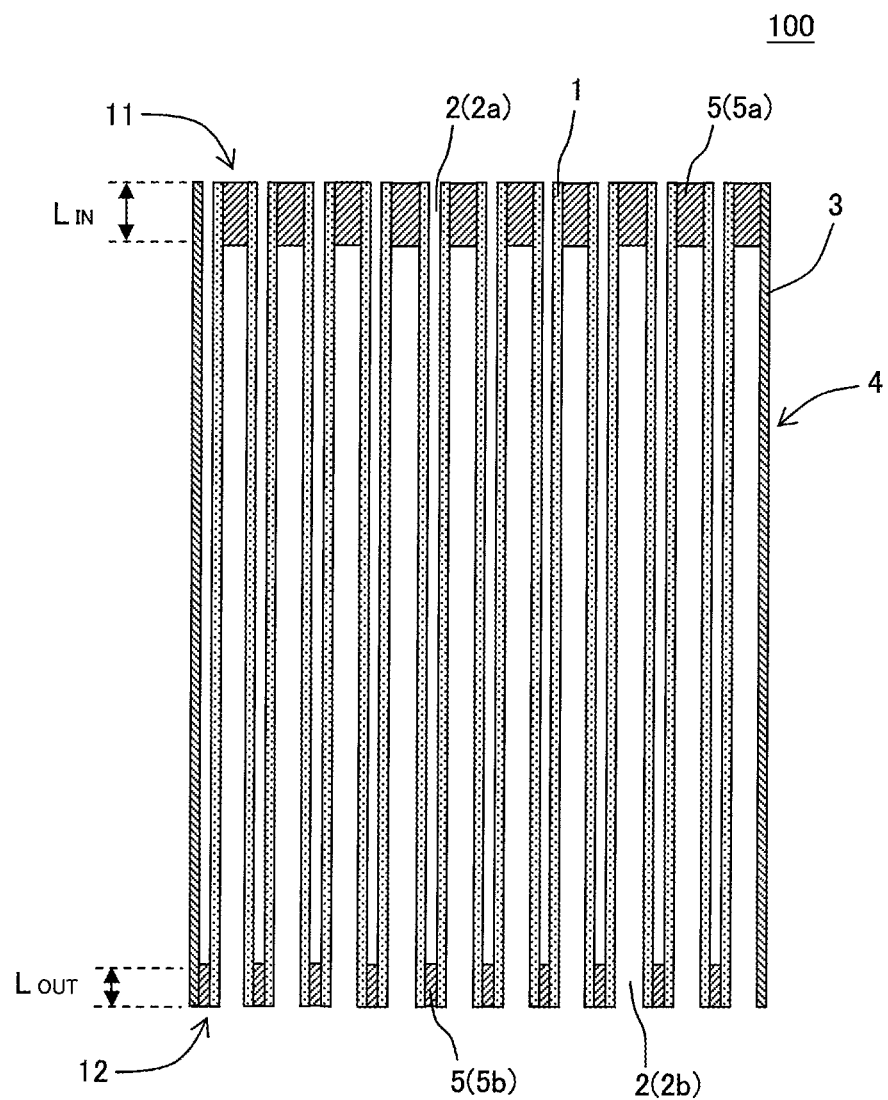
FIG. 4 is a schematic cross-sectional view taken along the line X-X' of FIG. 2.
Figure 5:
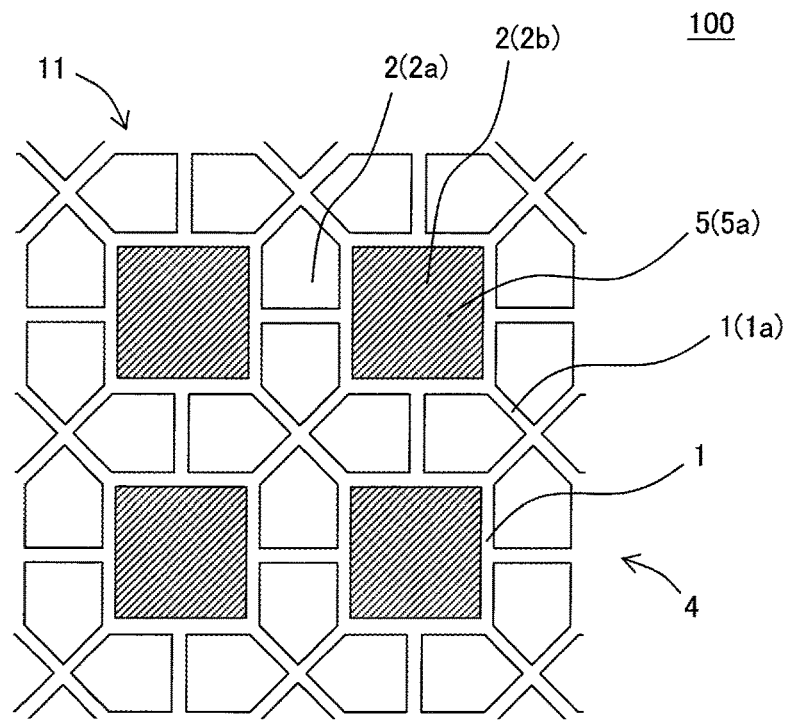
FIG. 5 is an enlarged plan view of the range surrounded with the broken line indicated with P in FIG. 2.

FIG. 1 is a perspective view schematically showing one embodiment of the honeycomb filter of the present invention. FIG. 2 is a plan view schematically showing the inflow end face of the honeycomb filter of FIG. 1. FIG. 3 is a plan view schematically showing the outflow end face of the honeycomb filter of FIG. 1. FIG. 4 is a schematic cross-sectional view taken along the line X-X' of FIG. 2. FIG. 5 is an enlarged plan view of the range surrounded with the broken line indicated with P in FIG. 2.

Figure 6:
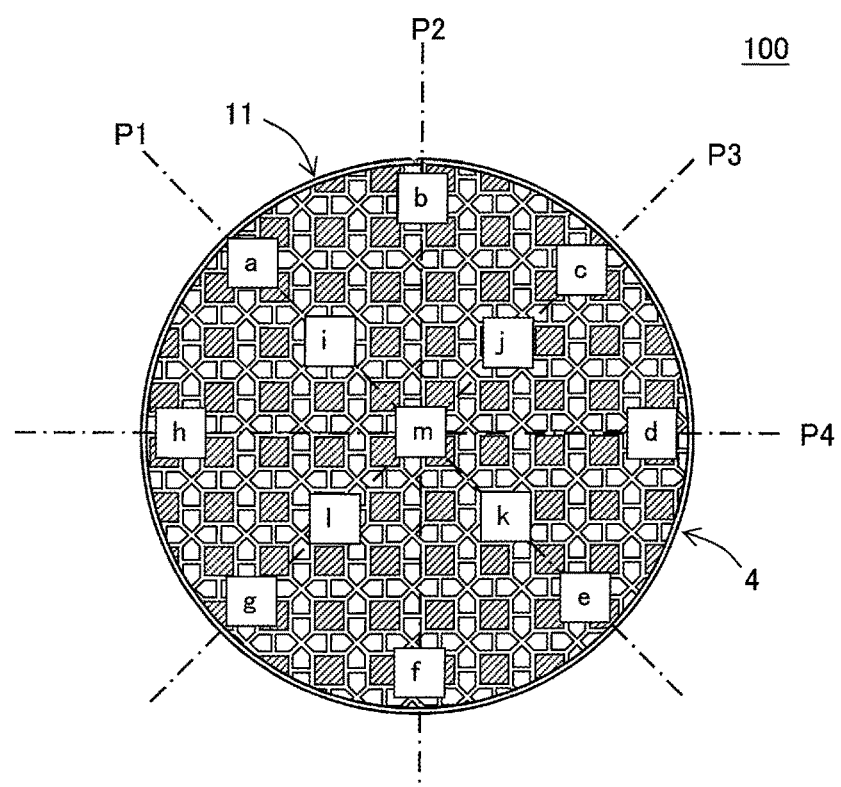
FIG. 6 is a schematic view to explain the method of calculating the average of the plugging length in one embodiment of the honeycomb filter of the present invention.

In the honeycomb filter 100, "the average of the plugging length $L_{IN}$ of the inflow side plugging portion 5a" and "the average of the plugging length $L_{OUT}$ of the outflow side plugging portion 5b" are values obtained as follows. FIG. 6 is a schematic view to explain the method of calculating the average of the plugging length in one embodiment of the honeycomb filter of the present invention. FIG. 6 is a plan view showing the inflow end face 11 of the honeycomb substrate 4 in the honeycomb filter 100.

To obtain "the average of the plugging length $L_{IN}$ of the inflow side plugging portion", one straight line P1 is firstly determined in the inflow end face 11 of the honeycomb substrate 4 as shown in FIG. 6 so that the straight line passes through the center of the inflow end face 11. Next, three straight lines are determined by rotating the straight line P1 clockwise by 45 degrees about the center of the inflow end face 11 as the rotation axis. These three straight lines are called straight line P2, straight line P3, and straight line P4. Eight intersections of these straight lines P1, P2, P3, and P4 with the circumference of the honeycomb substrate 4 are set as measuring points a to h. For straight line P1, two points that divide the straight line P1 into 4 equal parts on the inflow end face 11 of the honeycomb substrate 4 are set as measuring points i and k. For straight line P3, two points that divide the straight line P3 into 4 equal parts on the inflow end face 11 of the honeycomb substrate 4 are set as measuring points j and l. The center of the inflow end face 11 is set as measuring point m. In this way, thirteen measuring points a to m are determined. When "the average of the plugging length $L_{IN}$ of the inflow side plugging portion" is obtained, thirteen outflow cells 2b (see FIG. 4) located at the closest position from the measuring points a to m are found. Then, the lengths of the inflow side plugging portions 5a (see FIG. 4) disposed in these thirteen outflow cells 2b (see FIG. 4) are obtained. Then, the average of the lengths of the thirteen inflow side plugging portions 5a (see FIG. 4) is obtained as "the average of the plugging length $L_{IN}$ of the inflow side plugging portion".

The length of one inflow side plugging portion can be measured as follows. Firstly, the length of the honeycomb substrate from the inflow end face to the outflow end face is measured. Next, a pin gauge is inserted into the outflow cell having the inflow side plugging portion to be measured from the open end of the outflow end face, and the length of the cell is measured at a part without the inflow side plugging portion. Then, "the length of the cell at a part without the plugging portion" measured with the pin gauge is subtracted from "the length of the honeycomb substrate from the inflow end face to the outflow end face", whereby the length of the inflow side plugging portion can be obtained. The pin gauge is a rod-like measuring instrument made of a durable material. The pin gauge preferably has a diameter selected appropriately, depending on the size of the open end of the cell for inserting the pin gauge. For instance, a pin gauge of 0.7 mm in diameter can be used for a quadrangular cell of 0.8 mm in one side. Especially as a pin gauge to measure the length of a cell at a part without the inflow side plugging portion, such a pin gauge preferably has a diameter of 85% or more of the length of one side of the open end of the cell to be measured.

When "the average of the plugging length $L_{OUT}$ of the outflow side plugging portion" is obtained, thirteen inflow cells 2a (see FIG. 4) located at the closest positions from the measuring points a to m are found. Then, the lengths of the outflow side plugging portions 5b (see FIG. 4) disposed in these thirteen inflow cells 2a (see FIG. 4) are obtained. Then, the average of the lengths of the thirteen outflow side plugging portions 5b (see FIG. 4) is found as "the average of the plugging length $L_{OUT}$ of the outflow side plugging portion".

Similarly to the length of the inflow side plugging portion, the length of one outflow side plugging portion can be obtained by subtracting "the length of the cell at a part without the plugging portion" measured with a pin gauge from "the length of the honeycomb substrate from the inflow end face to the outflow end face".

The average of the plugging length $L_{IN}$ of the inflow side plugging portion is larger than the average of the plugging length $L_{OUT}$ of the outflow side plugging portion at least by 1.0 mm, more preferably by 1.0 to 4.0 mm. For instance, even when the average of the plugging length $L_{IN}$ is larger than the average of the plugging length $L_{OUT}$, if a difference therebetween is less than 1.0 mm, heat-retaining property at the inflow end face cannot be improved sufficiently or pressure loss of the honeycomb filter may increase excessively.

The average of the plugging length $L_{IN}$ of the inflow side plugging portion is preferably 3.5 mm or more, more preferably 3.5 to 8.5 mm, and particularly preferably 3.5 to 7.0 mm. If the average of the plugging length $L_{IN}$ of the inflow side plugging portions is less than 3.5 mm, the inflow side plugging portion may easily fall from the outflow cells. If the average of the plugging length $L_{IN}$ of the inflow side plugging portion is too large, the effect of improving the heat-retaining property of the inflow cells favorably can be obtained, but pressure loss in the honeycomb filter may increase.

In the honeycomb filter of the present embodiment, the length of the plugging portion can be compared among the thirteen measuring points a to m used for obtaining "the average of the plugging length $L_{IN}$ of the inflow side plugging portion" and "the average of the plugging length $L_{OUT}$ of the outflow side plugging portion" as stated above. For instance, the plugging length $L_{IN}$ of the inflow side plugging portion disposed in one outflow cell is preferably larger than the plugging length $L_{OUT}$ of the outflow side plugging portion disposed in the inflow cell adjacent to the one outflow cell via the partition wall. Especially, in comparison of the plugging length of the plugging portion between one outflow cell and an inflow cell adjacent to the one outflow cell via the partition wall, the following configuration is preferable. That is, the plugging length $L_{IN}$ of the inflow side plugging portion is larger than the plugging length $L_{OUT}$ of the outflow side plugging portion at least by 1.0 mm more preferably, and by 1.0 to 3.0 mm particularly preferably.

The shape of cells in the plane perpendicular to the extending direction of the cells is not limited especially. Note here that the honeycomb substrate has a partition wall to divide the inflow cells, and the inflow cells have a part of the shape that is defined by the "partition wall to divide the inflow cells". For instance, the cells may have a polygonal shape, such as a triangle, a quadrangle, a hexagon, and an octagon. The cell shape may be different between the inflow cells and the outflow cells.

The honeycomb filter 100 shown in FIGS. 1 to 5 are different in shape between the open ends of the outflow cells 2b and the open ends of the inflow cells 2a. In the honeycomb filter 100, the open ends of the outflow cells 2b have a quadrangular shape and the open ends of the inflow cells 2a have a pentagonal shape. The partition wall 1a is disposed to divide these pentagonal inflow cells 2a. When the honeycomb filter 100 are different in shape at the open ends between the outflow cells 2b and the inflow cells 2a, these open ends may have shapes other than a quadrangle and a pentagon as stated above.

For the shape of the open ends of the outflow cells and the inflow cells, a "quadrangle", for example, includes a quadrangular shape, a quadrangular shape having at least one curved corner of the quadrangle, a quadrangular shape having at least one corner of the quadrangle that is linearly chamfered, and the like. Similarly, a "pentagon" includes a pentagonal shape, a pentagonal shape having at least one curved corner of the pentagon, a pentagonal shape having at least one corner of the pentagon that is linearly chamfered, and the like. In the following, when the shape of the open ends of the outflow cells and the inflow cells are other polygons, such a polygon includes a polygonal shape having at least one curved corner of the polygon, a polygonal shape having at least one corner of the polygon that is linearly chamfered, and the like.

In the honeycomb filter 100, the area $S_{OUT}$ of the outflow cells 2b at the open ends and the area $S_{IN}$ of the inflow cells 2a at the open ends are preferably different. More preferably the area $S_{OUT}$ of the outflow cells 2b at the open ends is larger than the area $S_{IN}$ of the inflow cells 2a at the open ends. With this configuration, the honeycomb filter 100 has a remarkable effect of having more excellent temperature-rising property of the inflow cells 2a and more excellent heat-retaining property of the inflow cells 2a.

The honeycomb substrate 4 of the honeycomb filter 100 has a cell configuration such that a plurality of inflow cells 2a surround an outflow cell 2b. Specifically it has a cell configuration such that eight inflow cells 2a of a pentagonal shape at the open ends surround one outflow cell 2b of a quadrangular shape at the open end. With this configuration, the honeycomb filter 100 has a remarkable effect of suppressing a rise in pressure loss of the honeycomb filter effectively, and having excellent temperature-rising property of the inflow cells 2a as well as excellent heat-retaining property of the inflow cells 2a.

"A plurality of inflow cells 2a surrounding one outflow cell 2b" refers to the following configuration in the cross section perpendicular to the extending direction of the cells 2. The following describes the example where the outflow cells 2b have a quadrangular shape as shown in FIGS. 1 to 5. Firstly, these cells are disposed so that one side of each of the inflow cells 2a is adjacent to each of the four sides of the one outflow cell 2b. At this time, one side of two or more inflow cells 2a may be adjacent to one side of the one outflow cell 2b. That is, they may be disposed so that one side of one inflow cell 2a is adjacent to one side of the one outflow cell 2b at a half of the one side, and one side of another inflow cell 2a is adjacent to the one side of the one outflow cell 2b at the remaining half. Then, all of the inflow cells 2a adjacent to the one outflow cell 2b are disposed so that their one sides are adjacent to each other between the adjacent inflow cells 2a. Such an arrangement of the inflow cells 2a refers to "a plurality of inflow cells 2a surrounding one outflow cell 2b".

The thickness of the partition wall of the honeycomb substrate is preferably 0.13 to 0.43 mm, more preferably 0.15 to 0.38 mm, and particularly preferably 0.20 to 0.33 mm. Too small thickness of the partition wall may lead to deterioration in mechanical strength of the honeycomb substrate. Too large thickness of the partition wall may lead to increase in pressure loss of the honeycomb substrate.

The honeycomb substrate preferably has a cell density of 31 to 62 cells/cm$^2$, more preferably 39 to 55 cells/cm$^2$, and particularly preferably 46.5 to 55 cells/cm$^2$. If the cell density is less than 31 cells/cm$^2$, the mechanical strength of the honeycomb substrate may deteriorate. If the cell density exceeds 62 cells/cm$^2$, the pressure loss of the honeycomb filter may increase, or when the filter is loaded with catalyst, the cells may be clogged with the loaded catalyst.

The partition wall of the honeycomb substrate preferably has a porosity of 30 to 70%, more preferably 35 to 70%, and particularly preferably 40 to 70%. If the porosity of the partition wall is less than 30%, the pressure loss may increase. If the porosity of the partition wall exceeds 70%, the strength of the honeycomb substrate is not enough. When such a honeycomb filter is stored in a can used for an exhaust-gas purifying apparatus, it is difficult to hold the honeycomb filter with a sufficient grip force. The porosity of the partition wall is a value measured with a mercury porosimeter. An example of the mercury porosimeter includes Autopore 9500 (product name) produced by Micromeritics Co.

From the viewpoint of strength, heat resistance, durability, and the like, the partition wall is made of various types of ceramics, such as oxides and non-oxides, and metals as major components. Specifically, ceramics include at least one type of materials selected from the group consisting of cordierite, mullite, alumina, spinel, silicon carbide, silicon nitride, and aluminum titanate. Examples of the metals include Fe—Cr—Al based metals and metal silicon. One type or two types or more selected from these materials may preferably be included as a major component. Particularly preferably, one type or two types or more selected from the group consisting of alumina, mullite, aluminum titanate, cordierite, silicon carbide, and silicon nitride is contained as a major component from the viewpoints of high strength and high heat resistance. The ceramic material may be a composite material obtained by binding silicon carbide particles with cordierite as a binder, for example. Silicon carbide or silicon-silicon carbide composite materials are particularly suitable from the viewpoints of high heat conductivity and high heat resistance. Herein, the "major component" refers to the component making up 50 mass % or more of the components, preferably 70 mass % or more, and more preferably 80 mass % or more.

The overall shape of the honeycomb filter is not limited especially. For the overall shape of the honeycomb filter of the present embodiment, the inflow end face and the outflow end face preferably have a circular form or an elliptic shape, and particularly preferably have a circular form. The size of the honeycomb filter is not limited especially, and the length from the inflow end face to the outflow end face is preferably 50 to 305 mm. When the overall shape of the honeycomb filter is a round pillar-shape, their end faces preferably have a diameter of 25 to 330 mm.

The honeycomb filter of the present embodiment is preferably used as a member for exhaust-gas purification in an internal combustion engine. In the honeycomb filter of the present embodiment, at least one of the surface of the partition wall and the pores of the partition wall of the honeycomb substrate may be loaded with catalyst for exhaust-gas purification.

Figure 7:
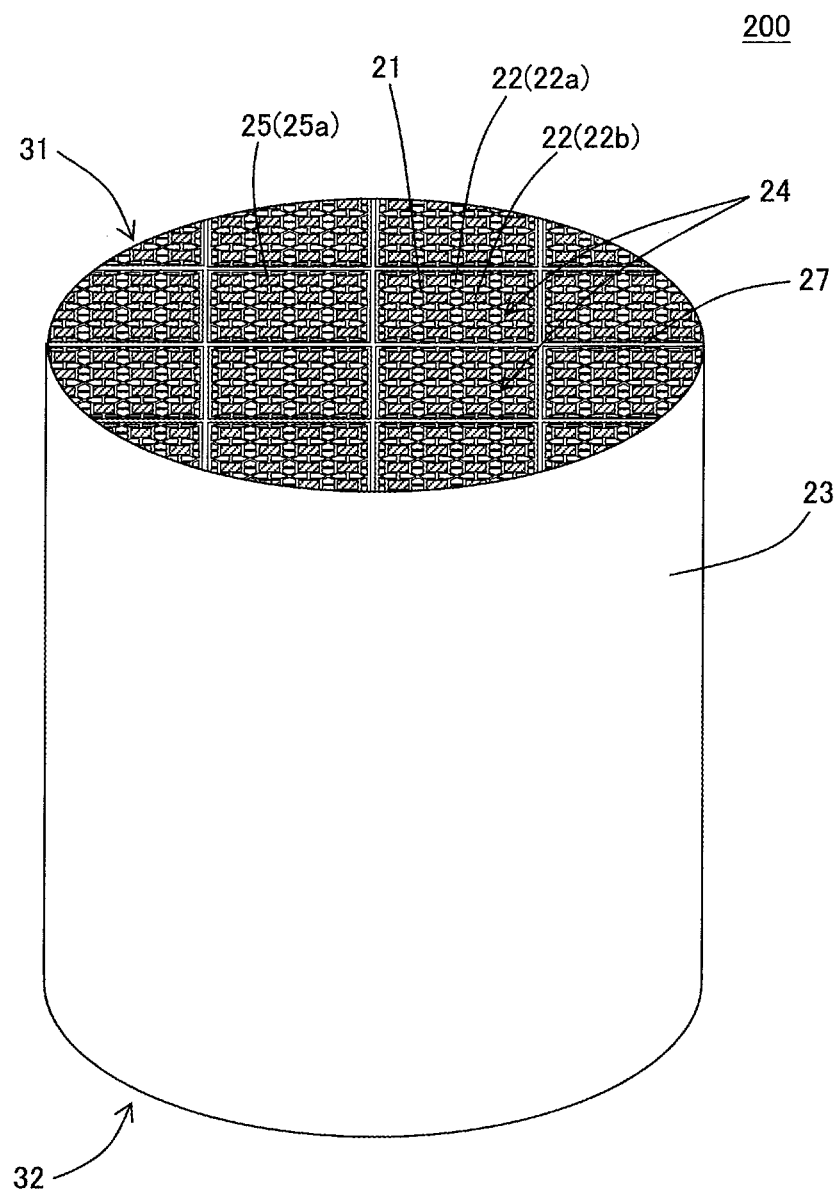
FIG. 7 is a perspective view schematically showing another embodiment of the honeycomb filter of the present invention.
Figure 8:
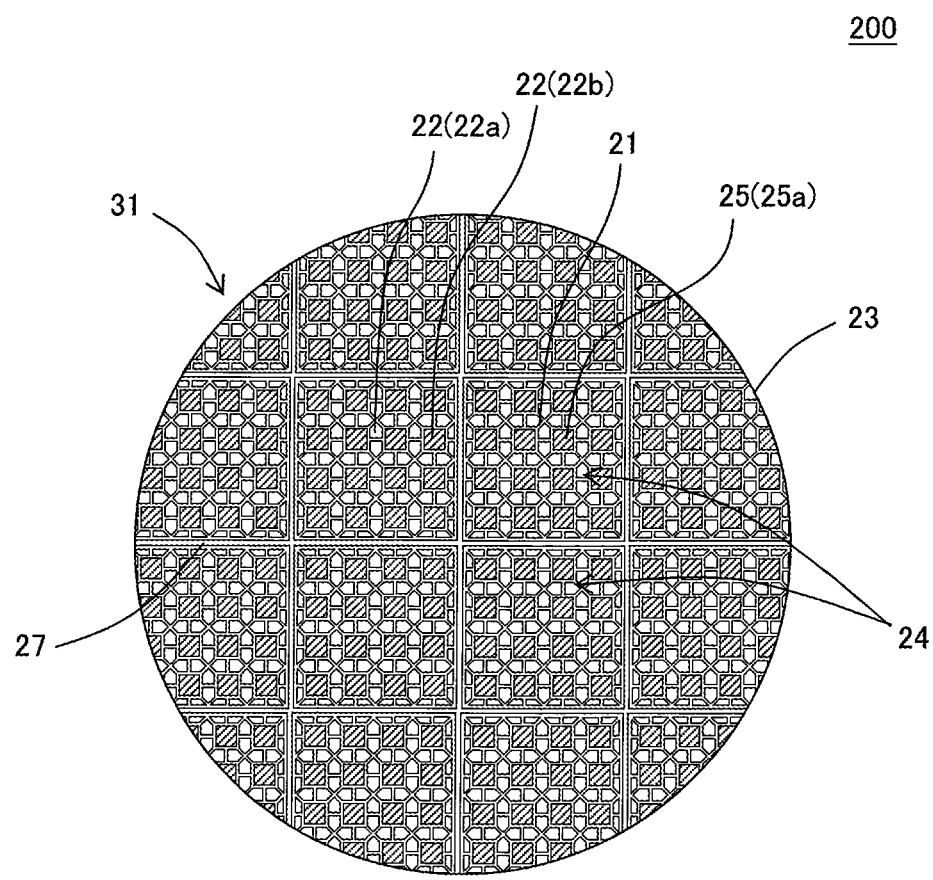
FIG. 8 is a plan view schematically showing the inflow end face of the honeycomb filter of FIG. 7.
Figure 9:
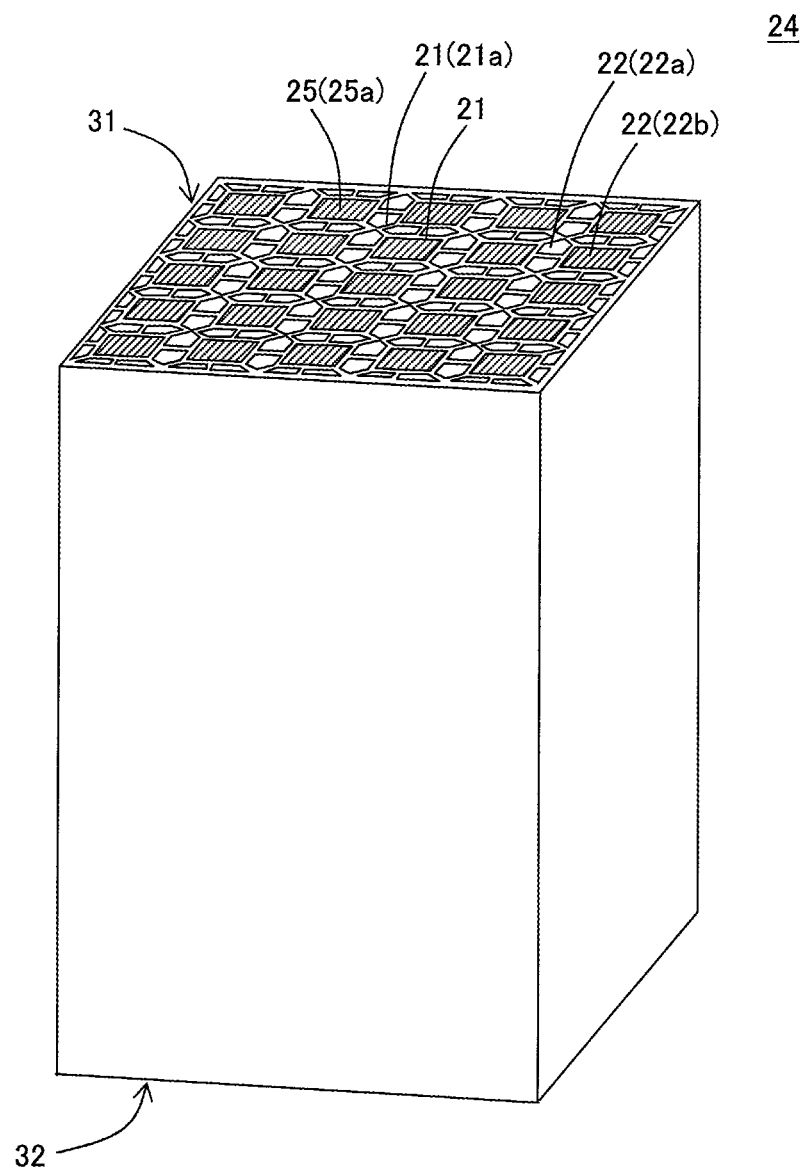
FIG. 9 is a perspective view schematically showing one honeycomb substrate making up the honeycomb filter of FIG. 7.
Figure 10:
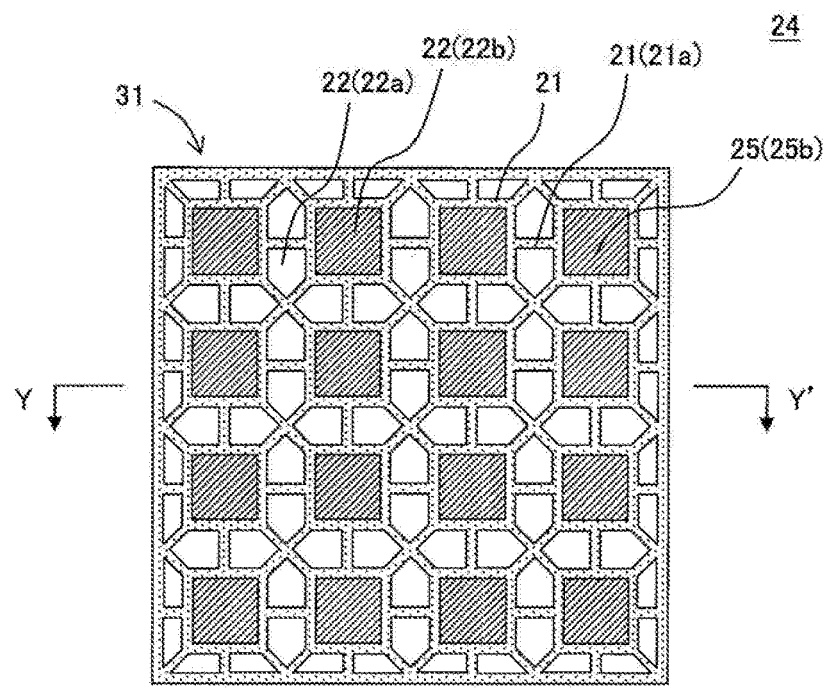
FIG. 10 is a plan view schematically showing the inflow end face of the honeycomb substrate of FIG. 9.
Figure 11:
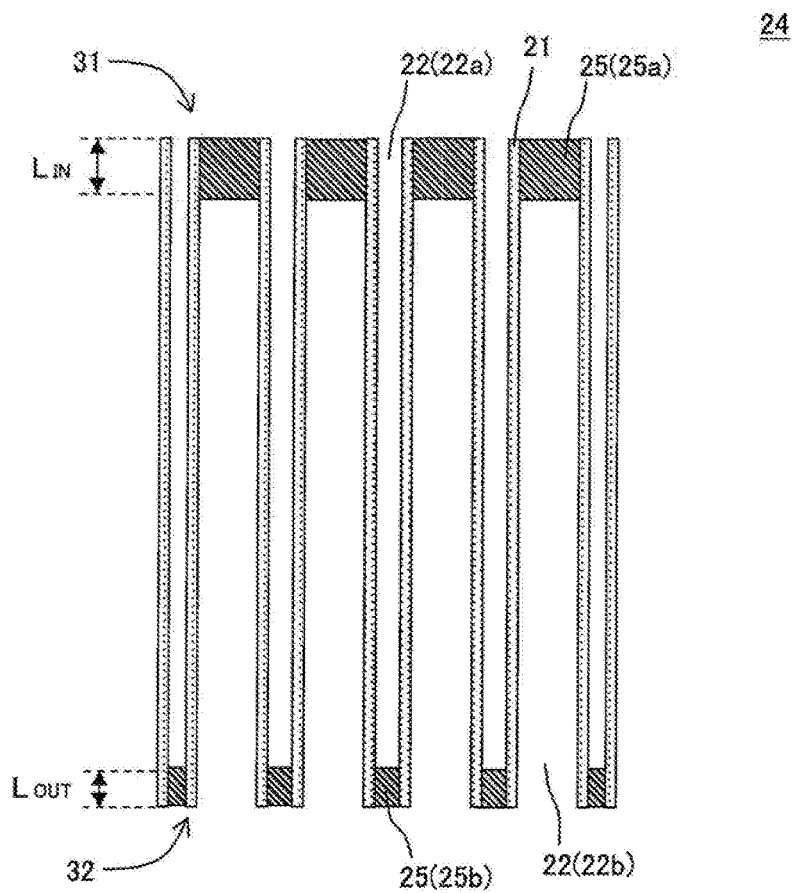
FIG. 11 is a schematic cross-sectional view taken along the line Y-Y' of FIG. 10.

The following describes another embodiment of the honeycomb filter of the present invention, with reference to FIGS. 7 to 11. FIG. 7 is a perspective view schematically showing another embodiment of the honeycomb filter of the present invention. FIG. 8 is a plan view schematically showing the inflow end face of the honeycomb filter of FIG. 7. FIG. 9 is a perspective view schematically showing one honeycomb substrate making up the honeycomb filter of FIG. 7. FIG. 10 is a plan view schematically showing the inflow end face of the honeycomb substrate of FIG. 9. FIG. 11 is a schematic cross-sectional view taken along the line Y-Y' of FIG. 10.

The honeycomb filter 200 in FIGS. 7 and 8 includes a plurality of honeycomb substrates 24, a plurality of inflow side plugging portions 25a, a plurality of outflow side plugging portions 25b (see FIG. 11), and a bonding layer 27. That is, the honeycomb filter 200 is a segmented-structured honeycomb filter made up of the collective form of a plurality of honeycomb substrates 24. The bonding layer 27 is disposed between lateral faces of the plurality of honeycomb substrates 24 to bond the plurality of honeycomb substrates 24.

The honeycomb substrate 24 includes a porous partition wall 21. In the honeycomb substrate 24, a plurality of cells 22 are defined by the porous partition wall 21, and the plurality of cells extend from the inflow end face 31 to the outflow end face 32 and serve as a through channel of fluid. The inflow side plugging portion 25a is disposed at the inflow end face 31 of the honeycomb substrate 24 to plug the open ends of the outflow cells 22b. The outflow side plugging portion 25b is disposed at the outflow end face 32 of the honeycomb substrate 24 to plug the open ends of the inflow cells 22a.

In the honeycomb filter 200, at least one honeycomb substrate 24 is configured as in the honeycomb substrate 24 shown in FIGS. 9 to 11. That is, the honeycomb substrate 24 of the honeycomb filter 200 has a partition wall 21a to define two inflow cells 22a by division. That is, similarly to the honeycomb filter 100 shown in FIGS. 1 to 3, the honeycomb substrate 24 of the honeycomb filter 200 has the partition wall 1a to divide the inflow cells 22a. The shapes of the inflow cells 22a and the outflow cells 22b of the honeycomb substrate 24 are preferably similar to those of the honeycomb filter of one embodiment as described above, e.g., similar to the honeycomb filter 100 shown in FIGS. 1 to 3. The honeycomb substrate 24 having such a partition wall 21a is configured so that the inflow side plugging portion 25a disposed in the outflow cells 22b has the average of the plugging length $L_{IN}$ that is larger than the average of the plugging length $L_{OUT}$ of the outflow side plugging portion 25b disposed in the inflow cells 22a. The honeycomb filter 200 including the thus configured honeycomb substrate 24 has excellent temperature-rising property of the inflow cells 22a as well as heat-retaining property of the inflow cells 22a when exhaust gas passes through the honeycomb filter.

Figure 12:
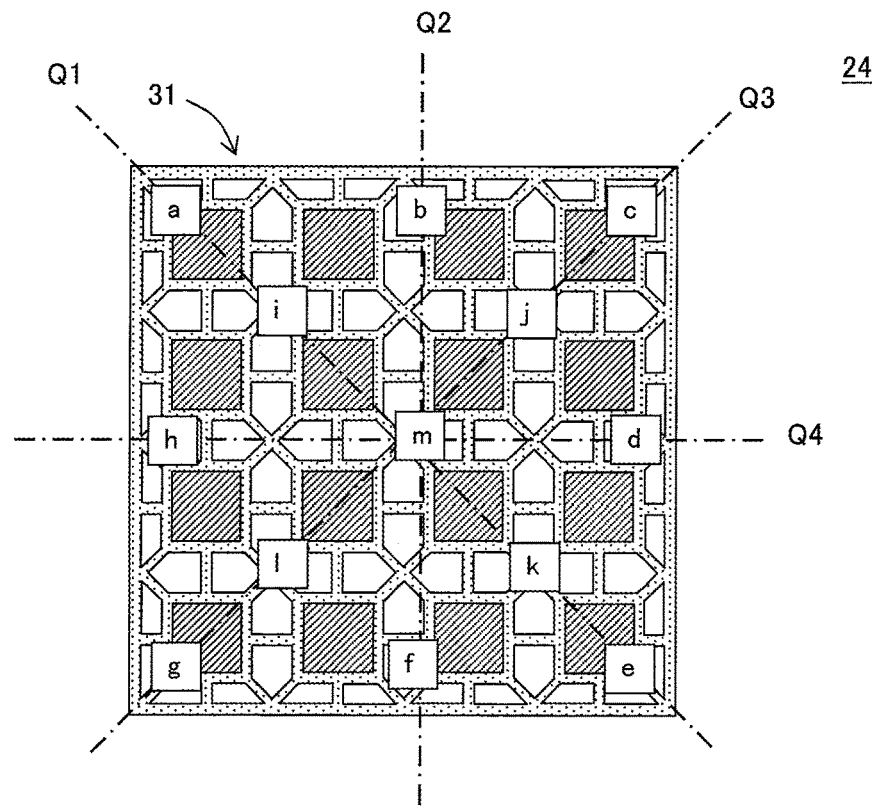
FIG. 12 is a schematic view to explain the method of calculating the average of the plugging length in the another embodiment of the honeycomb filter of the present invention.

In the segmented-structured honeycomb filter 200, "the average of the plugging length $L_{IN}$ of the inflow side plugging portion 25a" and "the average of the plugging length $L_{OUT}$ of the outflow side plugging portion 25b" are averages of the plugging lengths of one honeycomb substrate 24. The average of the plugging length of the honeycomb substrate 24 can be obtained as follows. FIG. 12 is a schematic view to explain the method of calculating the average of the plugging length in the another embodiment of the honeycomb filter of the present invention. FIG. 12 is a plan view showing one honeycomb substrate 24 at the inflow end face 31 that is extracted from the plurality of honeycomb substrates 24 making up the honeycomb filter 200.

The honeycomb substrate 24 in FIG. 12 has a quadrangular shape at the inflow end face 31. To obtain "the average of the plugging length $L_{IN}$ of the inflow side plugging portion" of such a honeycomb substrate 24, firstly straight line Q1 and straight line Q3 as diagonal lines are virtually drawn in the quadrangular inflow end face 31. Two straight lines Q2 and Q4 are virtually drawn so as to connect the midpoints of the opposed sides of the quadrangle in the quadrangular inflow end face 31. Eight intersections of the straight lines Q1, Q2, Q3, and Q4 with the circumference of the honeycomb substrate 24 are set as measuring points a to h. For straight line Q1, two points that divide the straight line Q1 into 4 equal parts on the inflow end face 31 of the honeycomb substrate 24 are set as measuring points i and k. For straight line Q3, two points that divide the straight line Q3 into 4 equal parts on the inflow end face 31 of the honeycomb substrate 24 are set as measuring points j and l. The center of the inflow end face 31 is set as measuring point m. In this way, thirteen measuring points a to m are determined. When "the average of the plugging length $L_{IN}$ of the inflow side plugging portion" is obtained, thirteen outflow cells 22b (see FIG. 11) located at the closest position from the measuring points a to m are found. Then, the lengths of the plugging portions of the inflow side plugging portions 25a (see FIG. 11) disposed in these thirteen outflow cells 22b (see FIG. 11) are obtained. Then, the average of the lengths of the thirteen plugging portions is obtained as "the average of the plugging length $L_{IN}$ of the inflow side plugging portion".

When "the average of the plugging length $L_{OUT}$ of the outflow side plugging portion" is obtained, thirteen inflow cells 22a (see FIG. 11) located at the closest position from the measuring points a to m are found. Then, the lengths of the plugging portions of the outflow side plugging portions 25b (see FIG. 11) disposed in these thirteen inflow cells 22a (see FIG. 11) are obtained. Then, the average of the lengths of the thirteen plugging portions is obtained as "the average of the plugging length $L_{OUT}$ of the outflow side plugging portion".

The length of one inflow side plugging portion and one outflow side plugging portion can be obtained by subtracting "the length of the cell at a part without the plugging portion" measured with a pin gauge from "the length of the honeycomb substrate from the inflow end face to the outflow end face".

In the segmented-structured honeycomb filter, at least one of the plurality of honeycomb substrates may be configured so that the average of the plugging length $L_{IN}$ of the inflow side plugging portions is larger than the average of the plugging length $L_{OUT}$ of the outflow side plugging portions. Note here that preferably all of the honeycomb substrates are configured so that the average of the plugging length $L_{IN}$ of the inflow side plugging portions is larger than the average of the plugging length $L_{OUT}$ of the outflow side plugging portions.

In the segmented-structured honeycomb filter, the value of a difference between the average of the plugging length $L_{IN}$ of the inflow side plugging portions and the average of the plugging length $L_{OUT}$ of the outflow side plugging portions, for example, is preferably similar to that of the honeycomb filter of the one embodiment described above.

Various conditions of the bonding layer to bond the plurality of honeycomb substrates, such as the material and the thickness, are not limited especially. For instance, the bonding layer may be configured similarly to a bonding layer in a conventionally well-known segmented-structured honeycomb filter.

Figure 13:
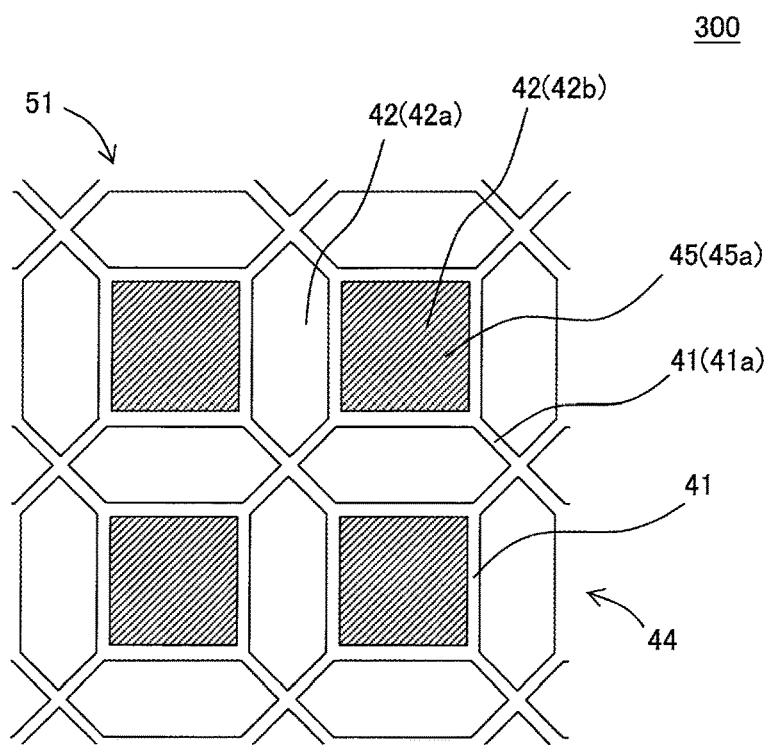
FIG. 13 is an enlarged plan view schematically showing the inflow end face of further another other embodiment of the honeycomb filter of the present invention.

The following describes further another embodiment of the honeycomb filter of the present invention, with reference to FIG. 13. FIG. 13 is an enlarged plan view schematically showing the inflow end face of further another embodiment of the honeycomb filter of the present invention.

A honeycomb filter 300 in FIG. 13 is configured so that the open ends of the outflow cells 42b and the open ends of the inflow cells 42a are different in shape. Specifically, the honeycomb filter is different from the honeycomb filter 100 shown in FIGS. 1 to 5 in the shape of the open ends of the inflow cells 42a. In the honeycomb filter 300, the open ends of the outflow cells 42b have a quadrangular shape and the open ends of the inflow cells 42a have a hexagonal shape.

The honeycomb filter 300 is preferably configured similarly to the honeycomb filter 100 shown in FIGS. 1 to 5 other than that the shape of the open ends of the inflow cells 42a is different from that of the honeycomb filter 100. That is, the honeycomb filter 300 includes a honeycomb substrate 44, a plurality of inflow side plugging portions 45a and a plurality of outflow side plugging portions (not illustrated). The honeycomb substrate 44 includes a porous partition wall 41. In the honeycomb substrate 44, a plurality of cells 42 are defined by a partition wall 41, and the plurality of cells extend from the inflow end face 51 to the outflow end face (not illustrated) and serve as a through channel of fluid. The inflow side plugging portion 45a is disposed at the inflow end face 51 of the honeycomb substrate 44 to plug the open ends of the outflow cells 42b. Although not illustrated, the outflow side plugging portion is disposed at the outflow end face of the honeycomb substrate 44 to plug the open ends of the inflow cells 42a.

The honeycomb substrate 44 of the honeycomb filter 300 has a partition wall 41a to define two inflow cells 42a by division. This honeycomb filter 300 is configured so that the average of the plugging length $L_{IN}$ of the inflow side plugging portions is larger than the average of the plugging length $L_{OUT}$ of the outflow side plugging portions.

In this honeycomb filter 300 as well, the honeycomb substrate 44 has a cell configuration such that a plurality of inflow cells 42a surround an outflow cell 42b. Specifically it has a cell configuration such that four inflow cells 42a of a hexagonal shape at the open ends surround one outflow cell 42b of a quadrangular shape at the open end. With this configuration, the honeycomb filter 300 has a remarkable effect of suppressing a rise in pressure loss of the honeycomb filter effectively, and having excellent temperature-rising property of the inflow cells 42a as well as excellent heat-retaining property of the inflow cells 42a.

Figure 14:
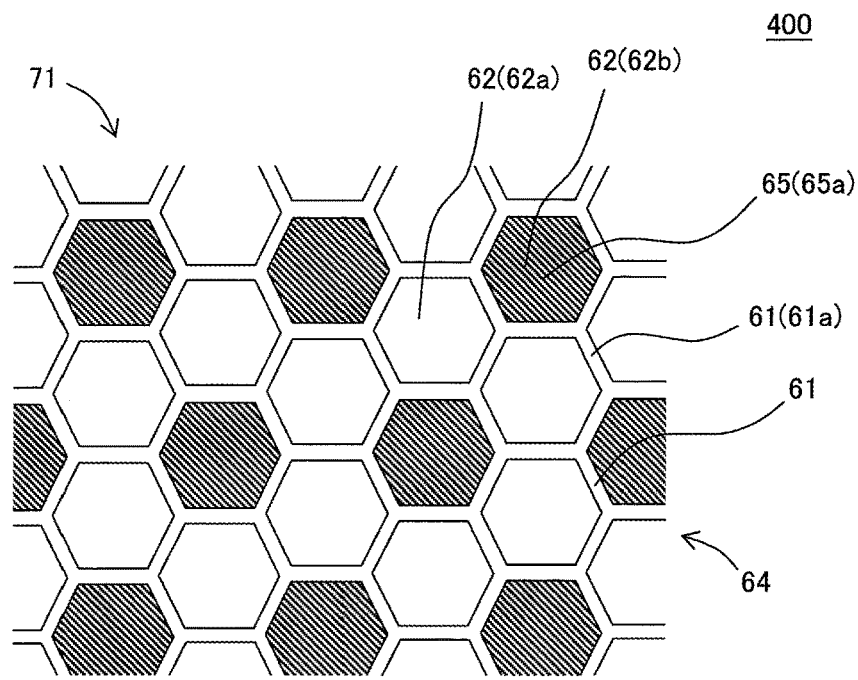
FIG. 14 is an enlarged plan view schematically showing the inflow end face of further another embodiment of the honeycomb filter of the present invention.

The following describes further another embodiment of the honeycomb filter of the present invention, with reference to FIG. 14. FIG. 14 is an enlarged plan view schematically showing the inflow end face of further another embodiment of the honeycomb filter of the present invention.

In the honeycomb filter 400 shown in FIG. 14, the open ends of the outflow cells 62b and the open ends of the inflow cells 62a have a hexagonal shape. The honeycomb filter 400 includes a honeycomb substrate 64, a plurality of inflow side plugging portions 65a and a plurality of outflow side plugging portions (not illustrated). The honeycomb substrate 64 includes a porous partition wall 61. In the honeycomb substrate 64, a plurality of cells 62 are defined by the partition wall 61, and the plurality of cells extends from the inflow end face 71 to the outflow end face (not illustrated) and serves as a through channel of fluid. The inflow side plugging portion 65a is disposed at the inflow end face 71 of the honeycomb substrate 64 to plug the open ends of the outflow cells 62b. Although not illustrated, the outflow side plugging portion is disposed at the outflow end face of the honeycomb substrate 64 to plug the open ends of the inflow cells 62a.

The honeycomb substrate 64 of the honeycomb filter 400 has a partition wall 61a to define two inflow cells 62a by division. This honeycomb filter 400 is configured so that the average of the plugging length $L_{IN}$ of the inflow side plugging portions is larger than the average of the plugging length $L_{OUT}$ of the outflow side plugging portions.

In this honeycomb filter 400 as well, the honeycomb substrate 64 has a cell configuration such that a plurality of inflow cells 62a surround an outflow cell 62b. With this configuration, the honeycomb filter 400 has a remarkable effect of suppressing a rise in pressure loss of the honeycomb filter effectively, and having excellent temperature-rising property of the inflow cells 62a as well as excellent heat-retaining property of the inflow cells 62a.

Figure 15:
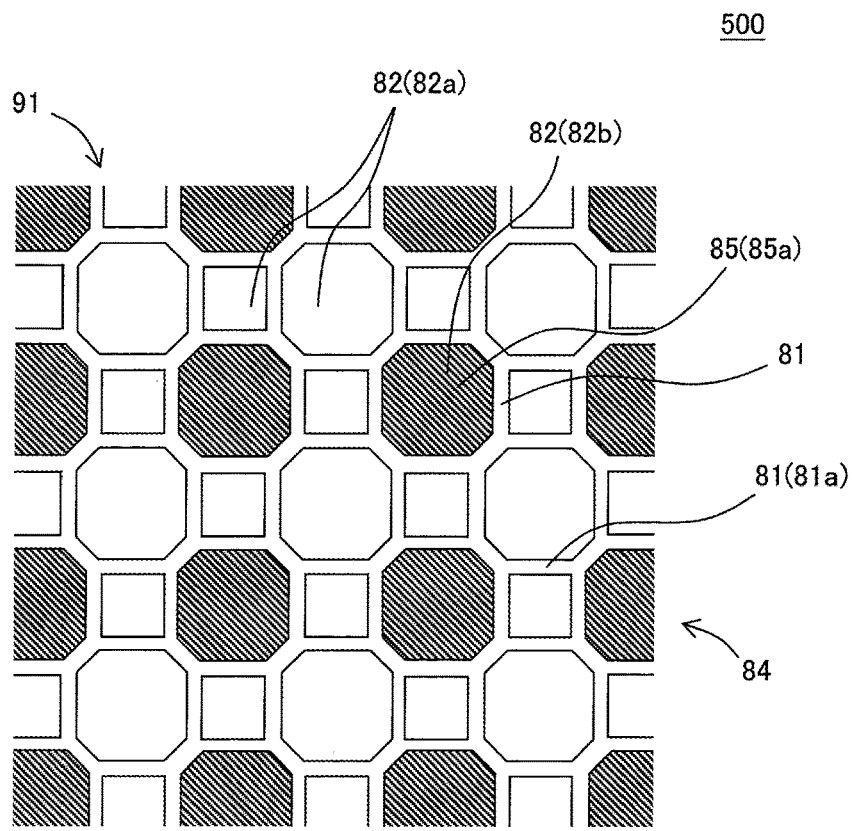
FIG. 15 is an enlarged plan view schematically showing the inflow end face of further another embodiment of the honeycomb filter of the present invention.

The following describes further another embodiment of the honeycomb filter of the present invention, with reference to FIG. 15. FIG. 15 is an enlarged plan view schematically showing the inflow end face of further another embodiment of the honeycomb filter of the present invention.

A honeycomb filter 500 in FIG. 15 is configured so that cells 82 of a quadrangular shape at the open ends and cells 82 of an octagonal shape at the open ends are defined by a partition wall 81. The inflow cells 82a of a quadrangular shape at the open ends and the inflow cells 82a of an octagonal shape at the open ends are disposed alternately via the partition wall 81 so as to surround one outflow cell 82b of an octagonal shape at the open end. In comparison between the cells 82 of a quadrangular shape at the open ends and the cells 82 of an octagonal shape at the open ends, the cells 82 of an octagonal shape at the open ends have a relatively large size at the open ends.

The honeycomb filter 500 includes a honeycomb substrate 84, a plurality of inflow side plugging portions 85a and a plurality of outflow side plugging portions (not illustrated). The honeycomb substrate 84 includes the porous partition wall 81. In the honeycomb substrate 84, a plurality of cells 82 are defined by the partition wall 81, and the plurality of cells extend from the inflow end face 91 to the outflow end face (not illustrated) and serve as a through channel of fluid. The inflow side plugging portion 85a is disposed at the inflow end face 91 of the honeycomb substrate 84 to plug the open ends of the outflow cells 82b. Although not illustrated, the outflow side plugging portion is disposed at the outflow end face of the honeycomb substrate 84 to plug the open ends of the inflow cells 82a.

The honeycomb substrate 84 of the honeycomb filter 500 has a partition wall 81a to define two inflow cells 82a by division. That is, the honeycomb substrate 84 includes the partition wall 81a dividing "the inflow cells 82a of a quadrangular shape at the open ends" and "the inflow cells 82a of an octagonal shape at the open ends". This honeycomb filter 500 is configured so that the average of the plugging length $L_{IN}$ of the inflow side plugging portions is larger than the average of the plugging length $L_{OUT}$ of the outflow side plugging portions.

(2) Method for Manufacturing Honeycomb Filter:

The following describes a method for manufacturing the honeycomb filter of the present invention.

Firstly a kneaded material having plasticity is prepared to produce a honeycomb substrate. The kneaded material to produce a honeycomb substrate can be prepared by adding additives, such as binder, and water as needed to a material selected as raw material powder from the aforementioned materials suitable for the partition wall.

Next, the thus prepared kneaded material is extruded, thus producing a pillar-shaped honeycomb formed body having a partition wall defining a plurality of cells and a circumferential wall disposed at the outermost circumference. In the extrusion, a die for the extrusion has an extruding face of the kneaded material, and the extruding face of the die may have a slit thereon in the reversed shape of the honeycomb formed body to be formed. The thus obtained honeycomb formed body may be dried by microwaves and hot air, for example.

Next, the open ends of the cells are plugged with a material similar to the material used for manufacturing of the honeycomb formed body, thus forming a plugging portion. A method for forming the plugging portion can follow a conventionally-known method for manufacturing a honeycomb filter. Note here that, when the honeycomb filter of the present invention is manufactured, the plugging portion is formed so that the average of the plugging length $L_{IN}$ of the inflow side plugging portions is larger than the average of the plugging length $L_{OUT}$ of the outflow side plugging portions. The inflow side plugging portions and the outflow side plugging portions are formed while selecting the cells to be plugged so that there exists the partition wall which defines two of the inflow cells by division. The following describes one example of the method for forming a plugging portion.

Firstly, a mask is applied to the inflow end face of the dried honeycomb formed body so as to cover the inflow cells. Next the masked end at the inflow end face of the honeycomb formed body is immersed in slurry for plugging to fill the open ends of the outflow cells without the mask with the slurry for plugging. Next, a mask is applied to the outflow end face of the honeycomb formed body so as to cover the outflow cells. Next the masked end at the outflow end face of the honeycomb formed body is immersed in slurry for plugging to fill the open ends of the inflow cells without the mask with the slurry for plugging. Subsequently, the slurry for plugging placed at the open ends of the outflow cells and the inflow cells is dried, thus forming the plugging portion to plug the open ends of the cells. The average of the plugging length $L_{IN}$ of the inflow side plugging portion and the average of the plugging length $L_{OUT}$ of the outflow side plugging portion can be adjusted by controlling the time to immerse the honeycomb formed body in the slurry for plugging or the depth of the immersion. The viscosity of the slurry for plugging used may be changed between at the inflow end face and at the outflow end face. The filling rate of the slurry for plugging into the cells correlates with the size of the open ends of the cells. Therefore, when a honeycomb filter to be manufactured has different sizes between the open ends of the outflow cells and the open ends of the inflow cells, the plugging length at the plugging portion can be adjusted using such a difference in size of the open ends.

Next, the thus obtained honeycomb formed body is fired, so as to obtain a honeycomb filter. Temperatures and atmosphere for the firing differ according to the raw material, and those skilled in the art can select the temperature and atmosphere for the firing that are the most suitable for the selected material. The method for manufacturing the honeycomb filter of the present invention is not limited to the method as described above.

EXAMPLES

Example 1

80 parts by mass of silicon carbide powder and 20 parts by mass of Si powder were mixed to obtain the mixture powder. To the mixture powder, binder, a pore former and water were added to have a forming raw material. Next, the forming raw material was kneaded to have a round pillar-shaped kneaded material.

Next, the kneaded material was extruded using a die for manufacturing of a honeycomb formed body to have a honeycomb formed body having a quadrangular-prismatic columnar shape as the overall shape. Sixteen of such honeycomb formed bodies were manufactured. In the extrusion, a die for the extrusion, which was for forming a honeycomb substrate having a cell shape as shown in FIGS. 7 to 11, was used.

Next, this honeycomb formed body was dried by a microwave dryer, and then was dried completely by a hot-air drier, and then both end faces of the honeycomb formed body were cut so as to have predetermined dimensions.

Next, a plugging portion was formed to the dried honeycomb formed body. Specifically a mask was firstly applied to the inflow end face of the honeycomb formed body so as to cover the inflow cells. Subsequently the masked end of the honeycomb formed body was immersed in slurry for plugging to fill the open ends of the outflow cells without the mask with the slurry for plugging. Subsequently the outflow end face of the honeycomb formed body also was filled with slurry for plugging at the open ends of the inflow cells similarly to the above. Subsequently the honeycomb formed body having the plugging portion formed was further dried by a hot-air drier. When filling with slurry for plugging, the filling depth of the slurry for plugging was adjusted by controlling the viscosity of the slurry for plugging, the amount of binder added to the slurry for plugging, and the size of the holes bored at the mask.

Next the honeycomb formed body having the plugging portion formed therein was degreased and fired, so as to obtain a honeycomb fired body. Degreasing was performed at 550° C. for 3 hours. Firing was performed at 1,450° C. for 2 hours in an argon atmosphere. The honeycomb fired body had a quadrangular-prismatic columnar shape as the overall shape. The honeycomb fired body had a square shape at the end faces, and the square had the length of 40 mm in one side. This honeycomb fired body was the honeycomb substrate of the honeycomb filter.

Next, the thus obtained sixteen honeycomb fired bodies were disposed so that their lateral faces were opposed mutually, and were bonded with a bonding material, so as to manufacture a honeycomb bonded member. The honeycomb bonded member were manufactured by bonding the sixteen honeycomb fired bodies in total so that the honeycomb fired bodies were disposed four in rows and four in columns at the end faces.

Next the circumferential part of the honeycomb bonded member was ground so that the honeycomb bonded member was circular in the cross section perpendicular to the extending direction of the cells. Subsequently, an outer coating material including a ceramic raw material was applied to the outermost circumference of the ground honeycomb bonded member. The outer coating material was applied while rotating the honeycomb bonded member.

The honeycomb bonded member with the outer coating material applied thereto was treated with heat at 600° C., so as to manufacture a honeycomb filter of Example 1.

The honeycomb filter of Example 1 had a cell configuration as in the honeycomb filter 200 shown in FIGS. 7 and 8, in which a plurality of inflow cells 22a surround one outflow cell 22b. Among the inflow cells 22a surrounding the outflow cell 22b, some of the inflow cells are defined by the partition wall 21a dividing the inflow cells 22a. In the field of "cell shape" of Table 1, the cell shape of the honeycomb filter of Example 1 was described as "FIG. 8". In the field of "cell shape" of Table 1, the cell shape of the honeycomb filter of each Example was described using the number of drawing to be referred to for the cell shape. For instance, when FIG. 13 is written in the fields of "cell shape" of Tables 1 to 4, the honeycomb filters of these Examples have a shape similar to the cell shape of the honeycomb filter 300 in FIG. 13. Note here that as for the number of the drawing written in the fields of "cell shape" of Tables 1 to 4, the cell shape only should be referred to in the drawing. That is, the drawing should not be referred to for other configurations of the honeycomb filter, for example, about the overall shape of the honeycomb filter in the drawing or as to whether the honeycomb substrate of the honeycomb filter in the drawing has a monolithic configuration or a segmented structure. The honeycomb filter of Example 1 had porosity of the partition wall that was 65%. The partition wall had a thickness of 0.33 mm. The end faces had a diameter of 143.8 mm and the length in the cell extending direction was 152.4 mm. The cell density was 46.5 cells/cm$^2$. The porosity of the partition wall is a value measured with a mercury porosimeter.

For the honeycomb substrate making up the thus obtained honeycomb filter, the average of the plugging length $L_{IN}$ of the inflow side plugging portion and the average of the plugging length $L_{OUT}$ of the outflow side plugging portion were measured. The plugging length was obtained as the average of the measurements at the thirteen measuring points a to m as shown in FIG. 12. The length of the at the measuring point a to m was obtained by subtracting "the length of the cell at a part without the plugging portion"

measured with a pin gauge from "the length of the honeycomb substrate from the inflow end face to the outflow end face". Table 1 shows the average of the plugging length $L_{IN}$ of the inflow side plugging portion and the average of the plugging length $L_{OUT}$ of the outflow side plugging portion.

The average of the average of the plugging length $L_{IN}$ of the inflow side plugging portion and the average of the plugging length $L_{OUT}$ of the outflow side plugging portion also was obtained. That is, this average was the average of the plugging length $L_{IN}$ and of the plugging length $L_{OUT}$. The obtained average is shown in the field of "average of plugging length" in Table 1.

The value obtained by subtracting the average of the plugging length $L_{OUT}$ of the outflow side plugging portion from the average of the plugging length $L_{IN}$ of the inflow side plugging portion is shown in the field of "$L_{IN}$(ave.)-$L_{OUT}$(ave.)" in Table 1.

Evaluation "excellent": When a decrease in the remaining amount of 0.6 g/L or more is found relative to the remaining amount (g/L) of the soot of the reference honeycomb filter during continuous regeneration, the honeycomb filter is evaluated as "excellent".

Evaluation "good": When a decrease in the remaining amount of 0.3 g/L or more and less than 0.6 g/L is found relative to the remaining amount (g/L) of the soot of the reference honeycomb filter during continuous regeneration, the honeycomb filter is evaluated as "good".

Evaluation "pass": When an increase in the remaining amount less than 0.3 g/L or the same remaining amount is found relative to the remaining amount (g/L) of the soot of the reference honeycomb filter during continuous regeneration, or even when the remaining amount decreases, the amount in decrease is less than 0.3 g/L, the honeycomb filter is evaluated as "pass".

TABLE 1

|  | Average of plugging length Lin of inflow side plugging portion (mm) | Average of plugging length Lout of outflow side plugging portion (mm) | Average of plugging length (mm) | Lin(ave.) − Lout(ave.) (mm) | Cell shape | Evaluations on soot amount during continuous regeneration | Evaluations on pressure loss property |
|---|---|---|---|---|---|---|---|
| Comp. Ex. 1 | 5.0 | 5.0 | 5.0 | 0.0 | FIG. 8 | Reference | Reference |
| Comp. Ex. 5 | 5.0 | 5.0 | 5.0 | 0.0 | — | Fail | — |
| Ex. 1 | 6.0 | 5.0 | 5.5 | 6.0 | FIG. 8 | Good | Pass |
| Ex. 2 | 7.0 | 5.0 | 6.0 | 2.0 | FIG. 8 | Excellent | Pass |
| Ex. 3 | 5.0 | 4.0 | 4.5 | 1.0 | FIG. 8 | Pass | Good |
| Ex. 4 | 5.0 | 3.0 | 4.0 | 2.0 | FIG. 8 | Pass | Excellent |
| Ex. 5 | 4.5 | 4.0 | 4.3 | 0.5 | FIG. 8 | Pass | Good |
| Ex. 6 | 4.5 | 3.5 | 4.0 | 1.0 | FIG. 8 | Pass | Excellent |
| Ex. 7 | 4.5 | 3.0 | 3.8 | 1.5 | FIG. 8 | Pass | Excellent |
| Comp. Ex. 6 | 3.0 | 7.0 | 5.0 | −4.0 | FIG. 8 | Fail | Pass |
| Comp. Ex. 7 | 3.0 | 6.0 | 4.5 | −3.0 | FIG. 8 | Fail | Good |

(Evaluations on Amount of Soot During Continuous Regeneration)

The amount of soot during continuous regeneration was evaluated by measuring the "remaining amount (g/L) of soot during continuous regeneration" by the following method. For the measurement of the remaining amount of soot during continuous regeneration, exhaust gas emitted from 4-cylinder diesel engine of 2.0 L was allowed to pass through a honeycomb filter, so as to deposit soot in the honeycomb filter. Subsequently, the engine was operated for 2 hours continuously by setting the engine revolutions constant at 2000 rpm and setting the temperature of gas flowing into the honeycomb filter at 450° C. The honeycomb filter was continuously regenerated by such a continuous operation. After the continuous operation, the amount of soot was calculated based on a difference in mass of the soot before and after the continuous regeneration of the honeycomb filter. Table 1 shows the measurement result. Using the remaining amount (g/L) of soot of Comparative Example 1 during continuous regeneration as a reference value, the amount of soot during continuous regeneration was evaluated in accordance with the following criteria. In Examples 1 to 7 and Comparative Examples 5 to 7, Comparative Example 1 was used as their reference honeycomb filter. In Examples 8, 9 and Comparative Examples 8, 9, Comparative Example 2 was used as their reference honeycomb filter. In Examples 10 to 12 and Comparative Examples 10, 11, Comparative Example 3 was used as their reference honeycomb filter. In Examples 13 to 15 and Comparative Examples 12, 13, Comparative Example 4 was used as their reference honeycomb filter.

Evaluation "fail": When an increase in the remaining amount of 0.3 g/L or more is found relative to the remaining amount (g/L) of the soot of the reference honeycomb filter during continuous regeneration, the honeycomb filter is evaluated as "fail".

(Evaluations on Pressure Loss Property)

Pressure loss property of the honeycomb filters was evaluated by the following criteria using, as their reference, the value of pressure loss of the honeycomb filter of Comparative Example 1 measured under the air conditions at 25° C., 1 atmosphere and 10 Nm³/min. In Examples 1 to 7 and Comparative Examples 5 to 7, Comparative Example 1 was used as their reference honeycomb filter. In Examples 8, 9 and Comparative Examples 8, 9, Comparative Example 2 was used as their reference honeycomb filter. In Examples 10 to 12 and Comparative Examples 10, 11, Comparative Example 3 was used as their reference honeycomb filter. In Examples 13 to 15 and Comparative Examples 12, 13, Comparative Example 4 was used as their reference honeycomb filter.

Evaluation "excellent": Let that the value of pressure loss of the reference honeycomb filter is set at 100%, when the value of pressure loss of a honeycomb filter to be evaluated is 99.5% or less, it is evaluated as "excellent".

Evaluation "good": Let that the value of pressure loss of the reference honeycomb filter is set at 100%, when the value of pressure loss of a honeycomb filter to be evaluated exceeds 99.5% and is less than 100%, it is evaluated as "good".

Evaluation "pass": Let that the value of pressure loss of the reference honeycomb filter is set at 100%, when the value of pressure loss of a honeycomb filter to be evaluated exceeds 100% and is 101% or less, it is evaluated as "pass".

Examples 2 to 15

Honeycomb filters were manufactured similarly to the method of Example 1 other than that the average of the plugging length $L_{IN}$ of the inflow side plugging portion and the average of the plugging length $L_{OUT}$ of the outflow side plugging portion were changed as shown in Tables 1 to 4. For the honeycomb filters of Examples 2 to 15, the "amount of soot during continuous regeneration" and "pressure loss property" were evaluated by the method similar to Example 1. Tables 1 to 4 show the result.

Comparative Examples 1 to 4, 6 to 13

Honeycomb filters were manufactured similarly to the method of Example 1 other than that the average of the plugging length $L_{IN}$ of the inflow side plugging portion and the average of the plugging length $L_{OUT}$ of the outflow side plugging portion were changed as shown in Tables 1 to 4. For the honeycomb filters of Comparative Examples 2 to 4, 6 to 13, the "amount of soot during continuous regeneration" and "pressure loss property" were evaluated by the method similar to Example 1. Tables 1 to 4 show the result.

Comparative Example 5

In Comparative Example 5, sixteen honeycomb segments were prepared, including quadrangular inflow cells and outflow cells, the inflow cells and the outflow cells being disposed alternately via a partition wall, and these honeycomb segments were bonded at their lateral faces with a bonding material, so as to manufacture a honeycomb bonded member. Next the circumferential part of the honeycomb bonded member was ground so that the honeycomb bonded member was circular in the cross section perpendicular to the extending direction of the cells. Subsequently, an outer coating material including a ceramic raw material was applied to the outermost circumference of the ground honeycomb bonded member. Next, the honeycomb bonded member with the outer coating material applied thereto was treated with heat at 600° C., so as to manufacture a honeycomb filter of Comparative Example 5. For the honeycomb filters of Comparative Example 5, the "amount of soot during continuous regeneration" was evaluated by the method similar to Example 1. Table 1 shows the result.

TABLE 2

| | Average of plugging length Lin of inflow side plugging portion (mm) | Average of plugging length Lout of outflow side plugging portion (mm) | Average of plugging length (mm) | Lin(ave.) − Lout(ave.) (mm) | Cell shape | Evaluations on soot amount during continuous regeneration | Evaluations on pressure loss property |
|---|---|---|---|---|---|---|---|
| Comp. Ex. 2 | 5.0 | 5.0 | 5.0 | 0.0 | FIG. 13 | Reference | Reference |
| Ex. 8 | 7.0 | 6.0 | 6.5 | 1.0 | FIG. 13 | Excellent | Pass |
| Ex. 9 | 7.0 | 4.0 | 5.5 | 3.0 | FIG. 13 | Excellent | Pass |
| Comp. Ex. 8 | 3.0 | 6.5 | 4.8 | −3.5 | FIG. 13 | Fail | Good |
| Comp. Ex. 9 | 3.0 | 5.5 | 4.3 | −2.5 | FIG. 13 | Fail | Good |

TABLE 3

| | Average of plugging length Lin of inflow side plugging portion (mm) | Average of plugging length Lout of outflow side plugging portion (mm) | Average of plugging length (mm) | Lin(ave.) − Lout(ave.) (mm) | Cell shape | Evaluations on soot amount during continuous regeneration | Evaluations on pressure loss property |
|---|---|---|---|---|---|---|---|
| Comp. Ex. 3 | 5.0 | 5.0 | 5.0 | 0.0 | FIG. 14 | Reference | Reference |
| Ex. 10 | 7.0 | 3.0 | 5.0 | 4.0 | FIG. 14 | Excellent | Pass |
| Ex. 11 | 6.0 | 4.0 | 5.0 | 2.0 | FIG. 14 | Good | Pass |
| Ex. 12 | 4.0 | 3.0 | 3.5 | 1.0 | FIG. 14 | Pass | Excellent |
| Comp. Ex. 10 | 3.0 | 5.0 | 4.0 | −2.0 | FIG. 14 | Fail | Excellent |
| Comp. Ex. 11 | 3.0 | 4.5 | 3.8 | −1.5 | FIG. 14 | Fail | Excellent |

TABLE 4

| | Average of plugging length Lin of inflow side plugging portion (mm) | Average of plugging length Lout of outflow side plugging portion (mm) | Average of plugging length (mm) | Lin(ave.) − Lout(ave.) (mm) | Cell shape | Evaluations on soot amount during continuous regeneration | Evaluations on pressure loss property |
|---|---|---|---|---|---|---|---|
| Comp. Ex. 4 | 5.0 | 5.0 | 5.0 | 0.0 | FIG. 15 | Reference | Reference |
| Ex. 13 | 6.0 | 3.0 | 4.5 | 3.0 | FIG. 15 | Good | Good |
| Ex. 14 | 7.0 | 4.0 | 5.5 | 3.0 | FIG. 15 | Excellent | Pass |
| Ex. 15 | 7.0 | 3.0 | 5.0 | 4.0 | FIG. 15 | Excellent | Pass |
| Comp. Ex. 12 | 3.0 | 4.0 | 3.5 | −1.0 | FIG. 15 | Fail | Excellent |
| Comp. Ex. 13 | 3.0 | 7.0 | 5.0 | −4.0 | FIG. 15 | Fail | Pass |

(Results)

For the honeycomb filters of Examples 1 to 15, all of the honeycomb filters had the results of "excellent" to "pass" successfully for the evaluations on the amount of soot during continuous regeneration and the pressure loss property. Particularly the honeycomb filters of Examples 1, 2, 8, 9, 10, 11, 14, and 15 had particularly good results for the evaluations on the amount of soot during continuous regeneration. The honeycomb filters of Examples 3 to 7, 12 and 13 had particularly good results for the evaluations on the pressure loss property. When a honeycomb filter did not have a partition wall dividing the inflow cells as in Comparative Example 5, it was evaluated as "fail" for the evaluation on the amount of soot during continuous regeneration. When a honeycomb filter had the average of the plugging length $L_{IN}$ of the inflow side plugging portions smaller than the average of the plugging length $L_{OUT}$ of the outflow side plugging portions as in Comparative Examples 6 to 13, such a honeycomb filter was evaluated as "fail" for the evaluation on the amount of soot during continuous regeneration.

In comparison between the honeycomb filters of Examples 2 to 7 and Comparative Examples 6 and 7, as the plugging length of the outflow side plugging portion decreased, a better evaluation on the pressure loss property was confirmed. As the plugging length of the inflow side plugging portion increased, a smaller amount of soot during continuous regeneration was confirmed. Similar tendency was confirmed also for Examples 8, 9 having the cell shape of FIG. 13, Examples 10 to 12 having the cell shape of FIG. 14, and Examples 13 to 15 having the cell shape of FIG. 15.

A honeycomb filter of the present invention can be used for a filter to purify exhaust gas.

DESCRIPTION OF REFERENCE NUMERALS

1, 21, 41, 61, 81: partition wall, 1*a*, 21*a*, 41*a*, 61*a*, 81*a*: partition wall (partition wall that defines two inflow cells by division), 2, 22, 42, 62, 82: cell, 2*a*, 22*a*, 42*a*, 62*a*, 82*a*: inflow cell, 2*b*, 22*b*, 42*b*, 62*b*, 82*b*: outflow cell, 3, 23: circumferential wall, 4, 24, 44, 64, 84: honeycomb substrate, 5, 25, 45, 65, 85: plugging portion, 5*a*, 25*a*, 45*a*, 65*a*, 85*a*: inflow side plugging portion, 5*b*, 25*b*: outflow side plugging portion, 11, 31, 51, 71, 91: inflow end face, 12, 32: outflow end face, 27: bonding layer, 100, 200, 300, 400, 500: honeycomb filter, P1, P2, P3, P4: straight line, Q1, Q2, Q3, Q4: straight line

What is claimed is:

1. A honeycomb filter comprising:
   a pillar-shaped honeycomb substrate including a porous partition wall that defines a plurality of cells extending from an inflow end face to an outflow end face;
   an inflow side plugging portion disposed at the inflow end face of the honeycomb substrate to plug open ends of outflow cells that are a part of the plurality of cells; and
   an outflow side plugging portion disposed at the outflow end face of the honeycomb substrate to plug open ends of inflow cells other than the outflow cells of the plurality of cells, wherein
   the honeycomb substrate includes the partition wall that defines two of the inflow cells by division, and
   an average of plugging lengths $L_{IN}$ of the inflow side plugging portions disposed in the outflow cells of the honeycomb substrate is larger than an average of plugging lengths $L_{OUT}$ of the outflow side plugging portions disposed in the inflow cells of the honeycomb substrate by 1.0 to 4.0 mm, and the average plugging lengths $L_{IN}$ is 3.5 to 7.0 mm.

2. The honeycomb filter according to claim 1, wherein plugging length $L_{IN}$ in the cell extending direction of the inflow side plugging portion disposed in one outflow cell of the outflow cells is larger than a plugging length $L_{OUT}$ in the cell extending direction of the outflow side plugging portion disposed in the inflow cell adjacent to the one outflow cell via the partition wall.

3. The honeycomb filter according to claim 2, wherein the plugging length $L_{IN}$ of the inflow side plugging portion disposed in the one outflow cell is larger than the plugging length $L_{OUT}$ of the outflow side plugging portion disposed in the inflow cell adjacent to the one outflow cell via the partition wall by at least 1.0 mm.

4. The honeycomb filter according to claim 3, wherein the plugging length $L_{IN}$ of the inflow side plugging portion disposed in the one outflow cell is larger than the plugging length $L_{OUT}$ of the outflow side plugging portion disposed in the inflow cell adjacent to the one outflow cell via the partition wall by 1.0 to 4.0 mm.

5. The honeycomb filter according to claim 1, wherein the outflow cells and the inflow cells have different shapes at open ends.

6. The honeycomb filter according to claim 1, wherein an area $S_{OUT}$ of the outflow cells at the open ends and an area $S_{IN}$ of the inflow cells at the open ends are different.

7. The honeycomb filter according to claim 6, wherein the area $S_{OUT}$ of the outflow cells at the open ends is larger than the area $S_{IN}$ of the inflow cells at the open ends.

8. The honeycomb filter according to claim 1, wherein the honeycomb substrate has a cell configuration, in which a plurality of the inflow cells surround one of the outflow cells.

9. The honeycomb filter according to claim 1, wherein the outflow cells has a quadrangular cell shape and the inflow cells have a pentagonal or hexagonal cell shape.

10. The honeycomb filter according to claim 1, comprising: a plurality of the honeycomb substrates; and a bonding layer disposed between lateral faces of the plurality of honeycomb substrates.

* * * * *